United States Patent
Nakamura

(10) Patent No.: US 8,113,157 B2
(45) Date of Patent: Feb. 14, 2012

(54) VARIABLE VALVE CONTROL APPARATUS

(75) Inventor: Makoto Nakamura, Isehara (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 367 days.

(21) Appl. No.: 12/540,060

(22) Filed: Aug. 12, 2009

(65) Prior Publication Data

US 2010/0050965 A1  Mar. 4, 2010

(30) Foreign Application Priority Data

Sep. 1, 2008 (JP) ................................. 2008-223070

(51) Int. Cl.
*F01L 1/34* (2006.01)
*F01L 1/00* (2006.01)

(52) U.S. Cl. ..................................... 123/90.15; 123/348

(58) Field of Classification Search ............... 123/90.15, 123/90.16, 90.17, 90.11, 90.12, 345, 346, 123/347, 348, 399
See application file for complete search history.

(56) References Cited

U.S. PATENT DOCUMENTS

| 6,065,444 A | 5/2000 | Jingu et al. |
| 6,530,361 B1 | 3/2003 | Shiraishi et al. |
| 2004/0237917 A1 * | 12/2004 | Yasui et al. ................ 123/90.15 |
| 2010/0175644 A1 | 7/2010 | Shinagawa et al. |

FOREIGN PATENT DOCUMENTS

| JP | 05-005430 A | 1/1993 |
| JP | 11-182329 A | 7/1999 |
| JP | 2001-020765 A | 1/2001 |
| JP | 2003-106177 A | 4/2003 |
| JP | 2003-172112 A | 6/2003 |
| JP | 2006-329023 A | 12/2006 |
| JP | 2007-231798 A | 9/2007 |
| JP | 2008-151059 A | 7/2008 |

* cited by examiner

*Primary Examiner* — Mahmoud Gimie
(74) *Attorney, Agent, or Firm* — Foley & Lardner LLP

(57) ABSTRACT

A variable valve control apparatus includes: a variable valve actuating mechanism arranged to vary a closing timing of an intake valve; and a controller configured to advance the closing timing of the intake valve before a bottom dead center of a piston of an intake stroke until a load of an engine increases from a minimum load to a predetermined load, and to retard the closing timing of the intake valve from a timing before the bottom dead center of the piston, to a timing after the bottom dead center of the piston when the load becomes the predetermined load.

20 Claims, 13 Drawing Sheets

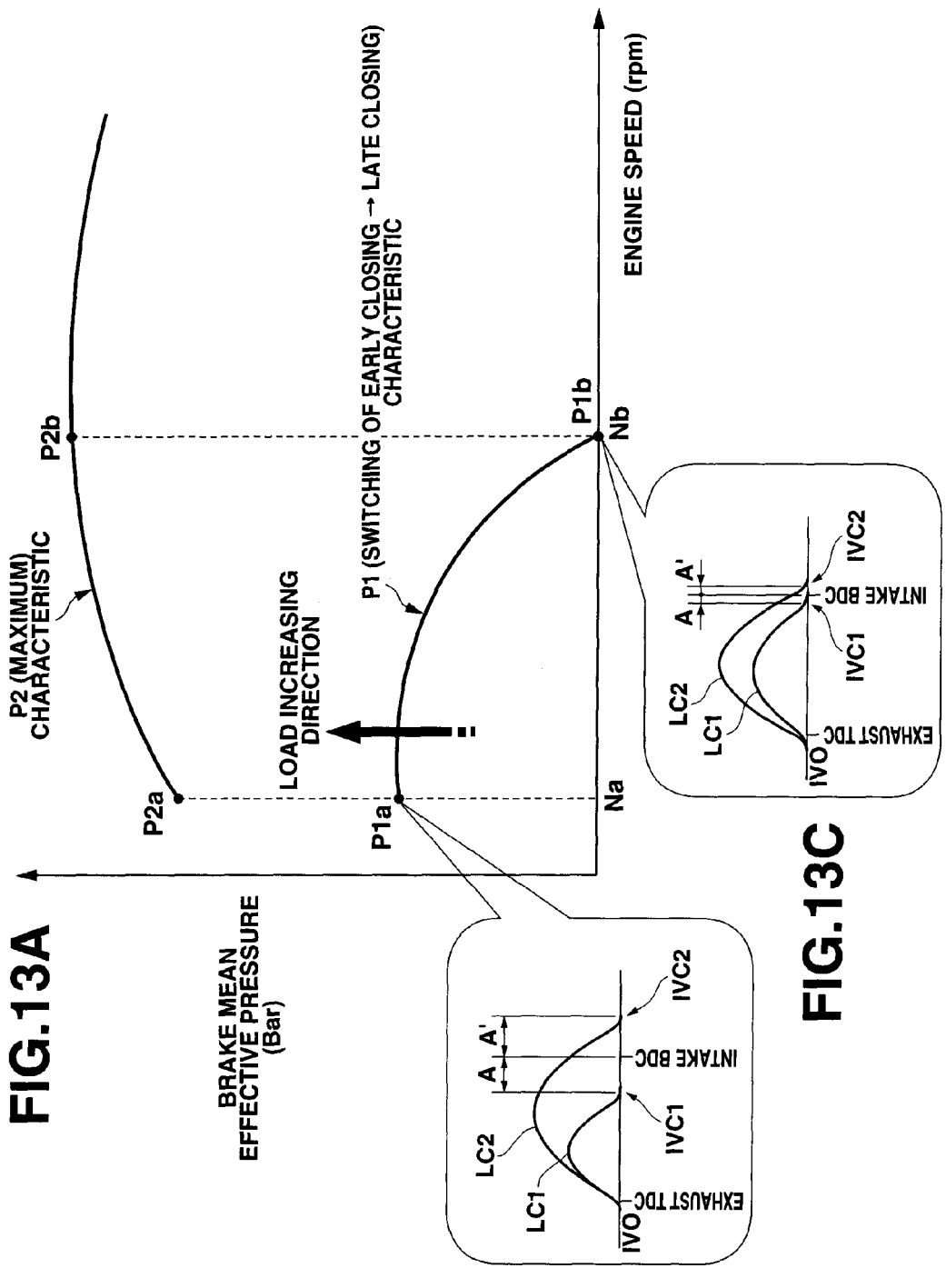

VARIABLE VALVE CONTROL APPARATUS

BACKGROUND OF THE INVENTION

This invention relates to a control apparatus for a variable valve actuating mechanism or a variable valve control apparatus which is configured to improve the fuel consumption and the combustion by retarding a closing timing of an intake valve when the engine shifts to a low and middle load region.

A conventional internal combustion engine needs uniformity or evenness of air-fuel mixture which affects fuel consumption and exhaust emission performance in a partial load (low and middle load) region.

Specifically, in an in-cylinder direct fuel-injection engine, the fuel is directly injected into the cylinder. The air-fuel mixture does not generate in advance in an intake pipe. Accordingly, it is difficult to generate the uniform or even air-fuel mixture. Moreover, the gas flow speed of the flesh air decreases in the low speed. This is disadvantageous to uniformize the air-fuel mixture. Moreover, the fuel injection quantity increases in a slightly high partial load region, and it is more difficult to uniform the air-fuel mixture.

Therefore, a patent document 1 (U.S. Pat. No. 6,065,444 (corresponding to Japanese Patent Application Publication No. 11-182329)) and a patent document 2 (Japanese Patent Application Publication No. 2003-106177) disclose flow regulating valves arranged to forcibly generate a swirl and a tumble in an intake port for producing the uniform air-fuel mixture within the combustion chamber in the partial load.

SUMMARY OF THE INVENTION

However, in a case in which the flow regulating valve is used as in the conventional apparatus, the flow resistance of the intake air increases, so that the output is suppressed. Moreover, the cost increases.

It is, therefore, an object of the present invention to provide a control apparatus for a variable valve actuating mechanism arranged to improve the combustion without using a flow regulating valve, to increase the output of the engine, and to decrease the cost.

According to one aspect of the present invention, a variable valve control apparatus comprises: a variable valve actuating mechanism arranged to vary a closing timing of an intake valve; and a controller configured to advance the closing timing of the intake valve before a bottom dead center of a piston of an intake stroke until a load of an engine increases from a minimum load to a predetermined load, and to retard the closing timing of the intake valve from a timing before the bottom dead center of the piston, to a timing after the bottom dead center of the piston when the load becomes the predetermined load.

According to another aspect of the invention, a variable valve control apparatus comprises: a variable valve actuating mechanism arranged to vary a closing timing of an intake valve; and a controller configured to advance the closing timing of the intake valve before a bottom dead center of a piston of an intake stroke when a variation of an accelerator opening is smaller than a predetermined quantity, and to retard the closing timing of the intake valve from a timing before the bottom dead center of the piston, to a timing after the bottom dead center of the piston when the variation of the accelerator opening becomes equal to or greater than the predetermined quantity.

According to still another aspect of the invention, a variable valve control apparatus comprises: a variable valve actuating mechanism arranged to vary a closing timing of an intake valve; and a controller configured to advance the closing timing of the intake valve before a bottom dead center of a piston of an intake stroke when a variation of an intake air is smaller than a predetermined quantity, and to retard the closing timing of the intake valve from a timing before the bottom dead center of the piston, to a timing after the bottom dead center of the piston when the variation of the intake air becomes equal to or greater than the predetermined quantity.

According to still another aspect of the invention, a variable valve control apparatus comprises: a variable valve actuating mechanism arranged to vary a closing timing of an intake valve; and a controller configured to vary, in a first control state, the closing timing of the intake valve closer to a bottom dead center of a piston of an intake stroke until a load of an engine increases from a minimum load to a predetermined load, to suddenly vary, in a second control state, the closing timing of the intake valve from a timing before the bottom dead center of the piston, to a timing after the bottom dead center of the piston by a variation speed greater than a variation speed in the first control state when the load becomes exceeds the predetermined load, and to gently vary, in a third state, the closing timing of the intake valve closer to the bottom dead center of the piston by a variation speed smaller than the speed in the second control state when the load further increases beyond the predetermined load.

BRIEF DESCRIPTION OF THE DRAWINGS

FIG. 13A is a control map showing a relationship between an engine speed and a brake mean effective pressure, in a variable valve actuating apparatus according to a third embodiment of the present invention. FIG. 13B is a characteristic view showing IVC of the intake valve in accordance with the variation of the load at the idling operation. FIG. 13C is a characteristic view showing IVC of the intake valve in accordance with the variation of the load in the middle speed region.

DETAILED DESCRIPTION OF THE INVENTION

Hereinafter, a variable valve actuating apparatus of an internal combustion engine according to a first embodiment of the present invention is illustrated. In this first embodiment, the present invention is applied to a four-cycle internal combustion engine for a gasoline vehicle. This internal combustion engine has a throttle valve of a butterfly type which is provided in an intake pipe, and which is arranged to control an intake air quantity.

Figure 1:
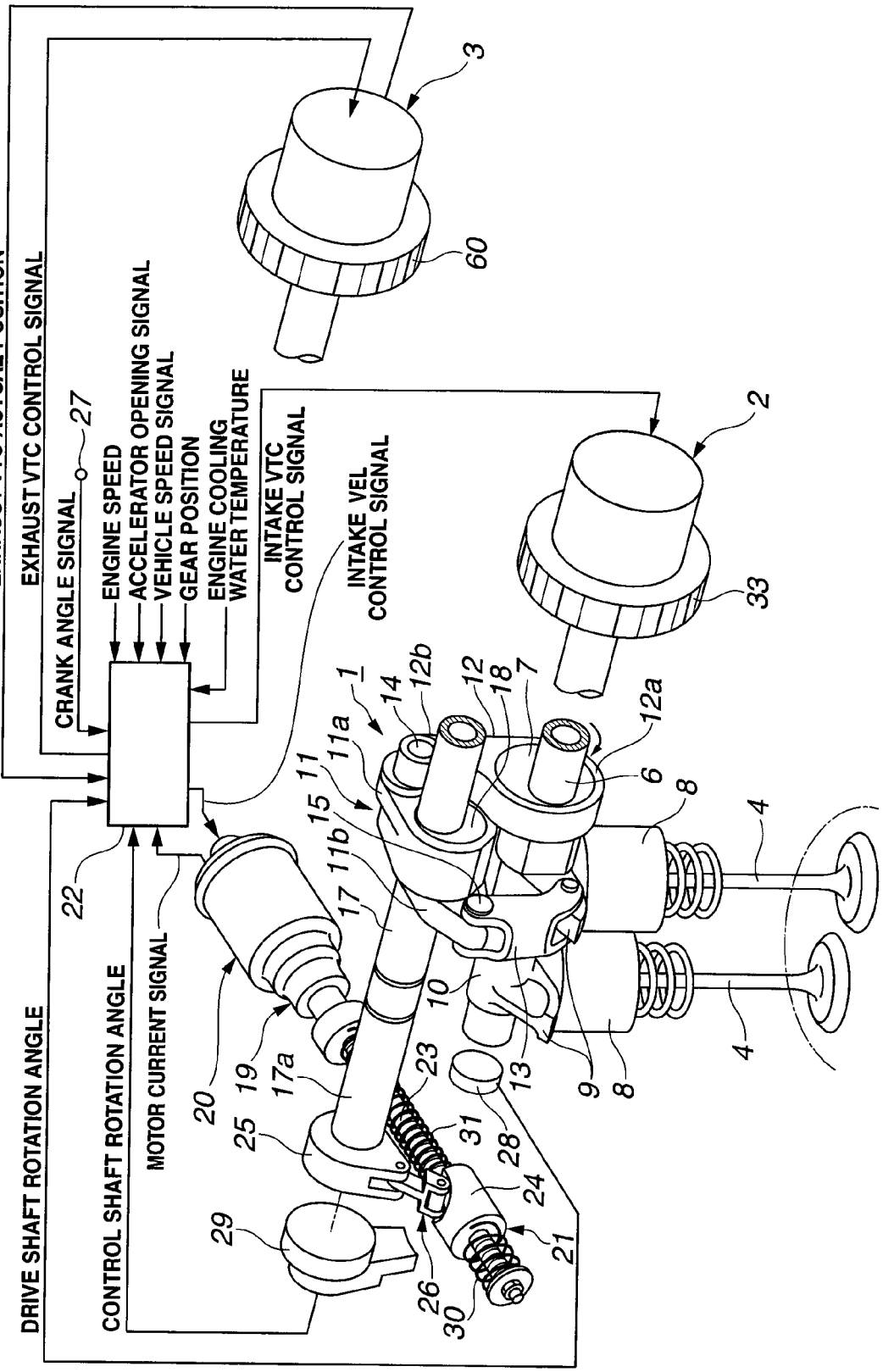
FIG. 1 is a perspective view showing a main part of a variable valve actuating apparatus according to a first embodiment of the present invention.

As shown in FIGS. 1-3, the variable valve actuating apparatus (mechanism) includes an intake VEL (intake valve operating angle varying mechanism, intake valve lift varying mechanism or intake event and lift varying mechanism) 1 for continuously varying (increasing or reducing) a valve lift quantity and operation angle (operating period, or period when a valve is open) of intake valves 4, 4; an intake VTC (intake valve timing varying mechanism, intake valve phase varying mechanism, or intake valve timing control mechanism) 2 arranged to continuously varying (advancing or retarding) a phase (maximum lift phase) of intake valves 4 so as to vary (advance or retard) the opening and closing timings of intake valves 4 (an intake valve opening timing IVO and an intake valve closing timing IVC), while holding constant the operating angle of intake valves 4, 4; and an exhaust VTC (exhaust valve timing varying mechanism, exhaust valve phase varying mechanism, or an exhaust valve timing control mechanism) for continuously varying (advancing or retarding) a phase (maximum lift phase) of exhaust valves (not shown) so as to vary (advance or retard) the opening timing and closing timings of the exhaust valves (an exhaust valve opening timing EVO and an exhaust valve closing timing EVC), while holding constant the operating angle of the exhaust valves.

Intake VEL 1 has a structure substantially identical to a structure disclosed in Japanese Patent Application Publication No. 2003-172112 which is filed by the applicant. Intake VEL 1 includes a hollow drive shaft 6 rotatably supported by bearings disposed on an upper part of a cylinder head S; a drive cam 7 fixed on an outer circumference surface of drive shaft 6 by press fit and so on; valve lifters 8, 8 each disposed on an upper end portion of one of intake valves 4, 4; and a pair of swing cams 9, 9 each swingably supported on the outer circumference surface of drive shaft 6, and each slidably abutted on an upper surface of one of valve lifters 8, and arranged to open one of intake valves 4, 4; and a transmitting mechanism (section) disposed between drive cam 7 and swing cams 9, 9, and arranged to vary the rotational force of drive cam 7 to a swing motion, and to transmit the swing motion to swing cams 9, 9.

Drive shaft 6 is arranged to receive the rotational force from a crank shaft by a timing chain (not shown) through a timing sprocket 33 provided to one end portion of drive shaft 6. A rotational direction of drive shaft 6 is set to a clockwise direction of FIG. 1 shown by an arrow.

Drive cam 7 is shaped like a ring. Drive cam 7 includes a drive shaft insertion hole formed in an axial direction. Drive cam 7 is fixed through the drive shaft insertion hole to drive shaft 6. The axis of drive cam 7 is offset in the radial direction from an axis of drive shaft 6 by a predetermined distance.

As shown in FIGS. 2 and 3, each of swing cams 9 is integrally formed with both end portions of a cylindrical cam shaft 10. Cam shaft 10 is rotatably supported on drive shaft 6 through an inner circumference surface of cam shaft 10. Each of swing cams 9 includes a cam surface 9a which is located on a lower surface of swing cam 9, and which has a base circle surface, a ramp surface, and a lift surface. The base circle surface, the ramp surface, and the lift surface of cam surface 9a are abutted on an upper surface of one valve lifter 8 in accordance with the swing position of swing cam 9.

The transmitting mechanism includes a rocker arm 11 which is disposed above drive shaft 6, and which has a first end portion 11a and a second end portion 11b; a link arm 12 connecting first end portion 11a of rocker arm 11 and drive cam 7; and a link rod 13 connecting second end portion 11b of rocker arm 11 and swing cam 9.

Rocker arm 11 includes a cylindrical base portion located on a substantially central portion of rocker arm 11, and rotatably supported by a control cam 18 described later through a supporting hole; a first end portion 11a rotatably connected with link arm 12 by a pin 14; and a second end portion 11b rotatably connected with a first end portion 13a of link rod 13 by a pin 15.

Link arm 12 includes an annular base portion 12a having a mounting hole located at a substantially central position. The cam body of drive cam 7 is rotatably mounted in the mounting hole of annular base portion 12a of link arm 12. Link arm 12 includes a protruding end 12b connected with first end portion 11a of rocker arm 11 by pin 14.

Link rod 13 includes a second end portion 13b rotatably connected through a pin 16 with a cam nose portion of swing cam 9.

A control shaft 17 is disposed above drive shaft 6, and rotatably supported by the same bearing member as drive shaft 6. Control cam 18 is slidably mounted in the supporting hole of rocker arm it, and fixed on the outer circumference surface of control shaft 17. Control cam 18 is a fulcrum (pivot point) of rocker arm 11 around which rocker arm 11 is pivoted.

Control shaft 17 extends in parallel with drive shaft 6 in forward and rearward directions of the engine. Control shaft 17 is controlled and rotated by a drive mechanism 19. Control cam 18 has a cylindrical shape. Control cam 18 has an axis which is off an axis of control shaft 17 by a predetermined quantity.

Drive mechanism 19 includes an electric motor 20 fixed at one end portion of a housing (not shown); and a ball screw transmitting section (mechanism) 21 provided within the housing, and arranged to transmit the rotational driving force of electric motor 20 to control shaft 17.

Electric motor 20 is a proportional DC motor. Electric motor 20 is driven by a control signal from a controller 22 which is a control mechanism configured to sense an engine driving state.

Ball screw transmitting section 21 includes a ball screw shaft 23 disposed substantially coaxially with a drive shaft of electric motor 20; a ball nut 24 which is a movable nut screwed on an outer circumference surface of ball screw shaft 23, and arranged to linearly move in the axial direction in accordance with forward and reverse rotations of ball screw shaft 23; a link arm 25 connected with one end portion of control shaft 17 along the diameter direction; and a link member 26 connecting link arm 25 and ball nut 24.

Ball screw shaft 23 includes an outer circumference surface continuously formed with a ball circulating groove with a predetermined width in a spiral shape, except for both end portions of ball screw shaft 23. Ball screw shaft 23 includes one end portion connected with the drive shaft of electric motor 20. Ball screw shaft 23 is driven and rotated by electric motor 20.

Ball nut 24 has a substantially cylindrical shape. Ball nut 24 includes a guide groove which is continuously formed in an inner circumference surface of ball nut 24 in a spiral shape, and which holds a plurality of balls with the ball circulating groove of ball screw shaft 23 to roll the balls between the guide groove and the ball circulating groove. Ball screw shaft 23 and ball nut 24 coverts, through the balls, the rotational movement of ball screw shaft 23 to the linear movement of ball nut 24 in the axial direction. Ball nut 24 is urged toward electric motor 20 (minimum lift side) by a first coil spring 30 which is a first urging member, and urged in a direction (maximum lift side) opposite to electric motor 20 by a second coil spring 31 which is a second urging member provided in a position to confront first coil spring 30. Accordingly, when the engine is at rest, ball nut 24 is stably held in a substantially central position (central lift region between the maximum lift and the minimum lift) of ball screw shaft 23 in the axial direction by the spring forces of first coil spring 30 and second coil spring 31 which confront each other. That is, ball nut 24 is stably held (stabilized) in a mechanical manner in the central position.

Controller 22 senses a current engine driving state from a crank angle signal and an engine speed signal from a crank angle sensor 27 arranged to sense a current engine speed (rpm), and various information signals such as an accelerator opening sensor, a vehicle speed sensor, a gear position sensor, and an engine cooling water temperature arranged to sense a temperature of the engine body. Moreover, controller 22 receives a sensed signal from a drive shaft angle sensor 28 arranged to sense a rotation angle of drive shaft 6, and a sensed signal from a potentiometer 29 arranged to sense a rotational position of control shaft 17.

The thus-constructed intake VEL 1 is controlled to operate as follows. When the engine is operating in a predetermined engine operating region, electric motor 20 is rotated in one direction by a control current from controller 22. Ball screw shaft 23 is rotated in the one direction by receiving the rotational torque of electric motor 20. Consequently, ball nut 24 is linearly moved in one direction (toward electric motor 20) by the rotational torque of electric motor 20. Consequently, control shaft 17 is rotated in one direction through link member 26 and link arm 25.

Figure 2A:
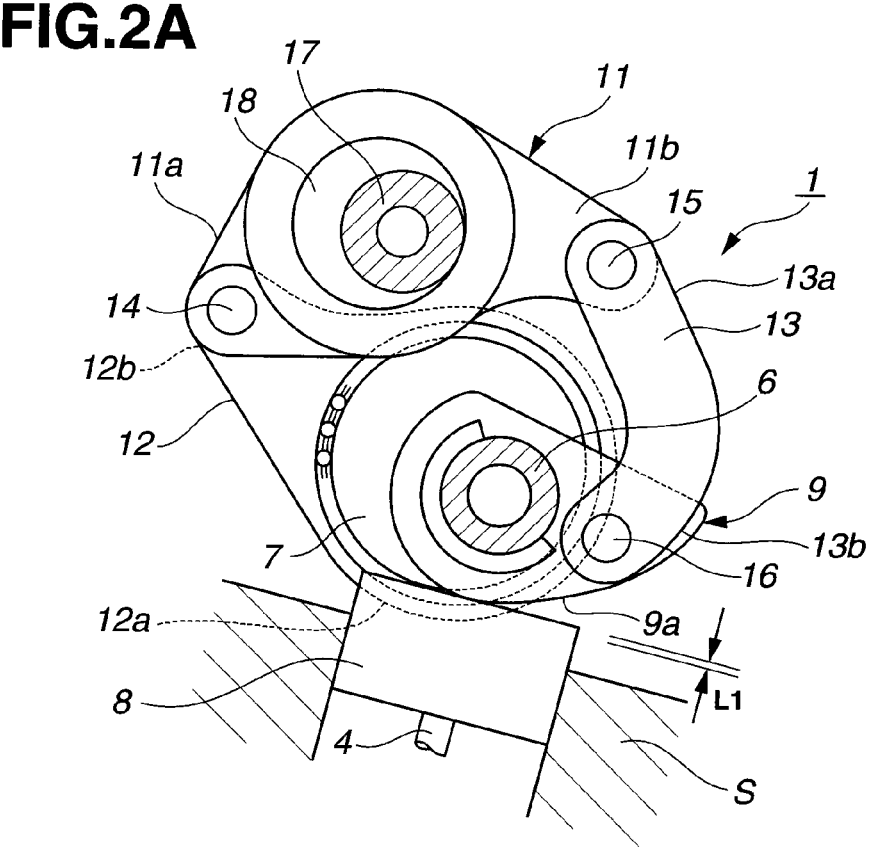
FIGS. 2A and 2B are views showing operations of an intake VEL in a small lift control state.
Figure 2B:
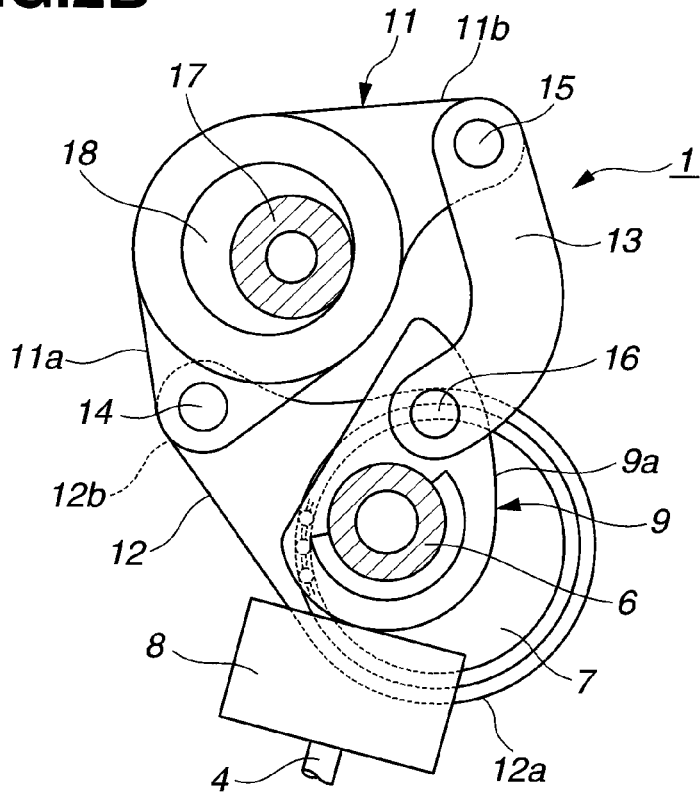

Accordingly, the axis of control cam 18 is rotated around the axis of control shaft 17 by the same radius, as shown in FIGS. 2A and 2B (rear view), so that a thick portion of control cam 18 is moved with respect to drive shaft 6 in the upward direction. As a result, the pivot point between second end portion 11b of rocker arm 11 and link rod 13 is moved in the upward direction relative to drive shaft 6. Consequently, the cam nose portion of swing cam 9 is forcibly pulled up through link rod 13, and the entirety of swing cam 9 is pivoted in the counterclockwise direction of FIGS. 2A and 2B.

Accordingly, drive cam 7 rotates and pushes up first end portion 11a of rocker arm 11 through the link arm 12. The lift quantity is transmitted through link rod 13 to swing cams 9 and valve lifers 8. Consequently, the lift quantity of each of intake valves 4, 4 becomes a small lift (L1) shown in a valve lift curve of FIG. 4. Operation angle D1 (half of crank valve opening period) becomes small.

There is a valve clearance between swing cam 9 and valve lifter 8. Therefore, the actual valve lift is smaller by the valve clearance than the lift of swing cam 9. Accordingly, the operation angle is defined from an opening timing to a closing timing of the valve lift (the valve operating angle is defined as extending from the timing when the valve is actually opened to the timing when the valve is actually closed).

When the engine is operating in another predetermined engine operating region, electric motor 20 is rotated in the other direction by the control signal from controller 22. Ball screw shaft 23 is rotated by receiving the rotational torque of electric motor 20. Ball nut 24 is linearly moved in the opposite direction by this rotation of ball screw shaft 23. Consequently, control shaft 17 is rotated and driven in the counterclockwise direction of FIG. 2 by a predetermined quantity.

Therefore, the axis of control cam 18 is held in an angular position in which the axis of control cam 18 is shifted downward by a predetermined quantity from the axis of control shaft 17, so that the thick portion of control cam 18 is moved in the downward direction. Consequently, the entirety of rocker arm 11 is moved in the clockwise direction from the position in FIGS. 2A and 2B. The nose portion of swing cam 9 is forcibly pushed down through link member 13, so that the entirety of swing cam 9 is slightly pivoted in the clockwise direction.

Accordingly, drive cam 7 rotates and pushes up the end 11a of rocker arm 11 through link arm 12. A movement for valve lift is transmitted through link rod 13 to swing cams 9 and valve lifters 8. In this case, the valve lift of each of intake valves 4, 4 is increased to a medium lift L2 shown in FIG. 4, and the operation angle is increased to a medium angle D2. By this control operation, the variable valve actuating system can shift the intake valve closing timing on the retard side toward the bottom dead center. By so doing, the variable valve actuating system can improve the combustion in a cold start operation with a higher effective compression ratio, and increase the fresh air charging efficiency to increase the combustion torque.

Figure 3A:
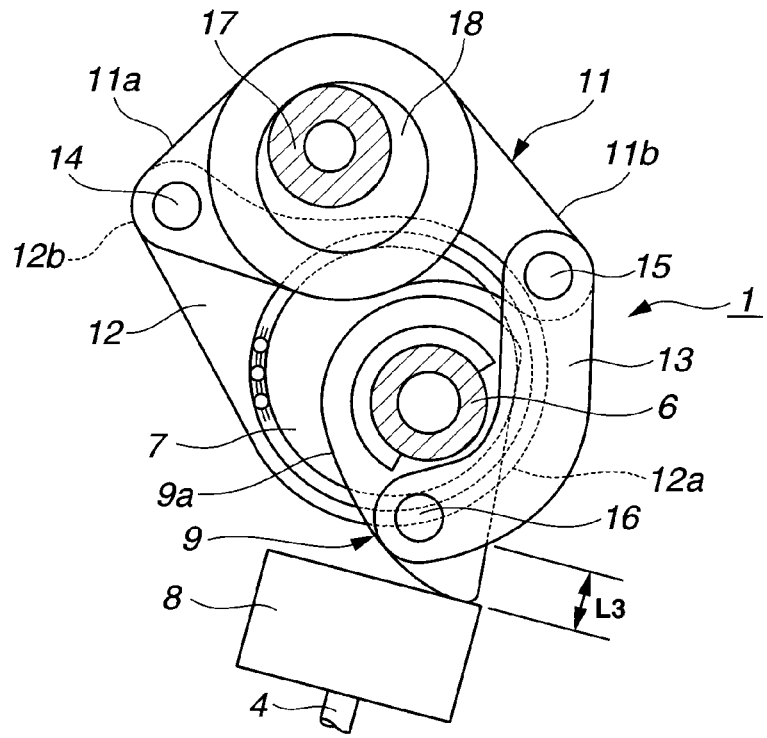
FIGS. 3A and 3B are views showing operations of the intake VEL in a maximum lift control state.
Figure 3B:
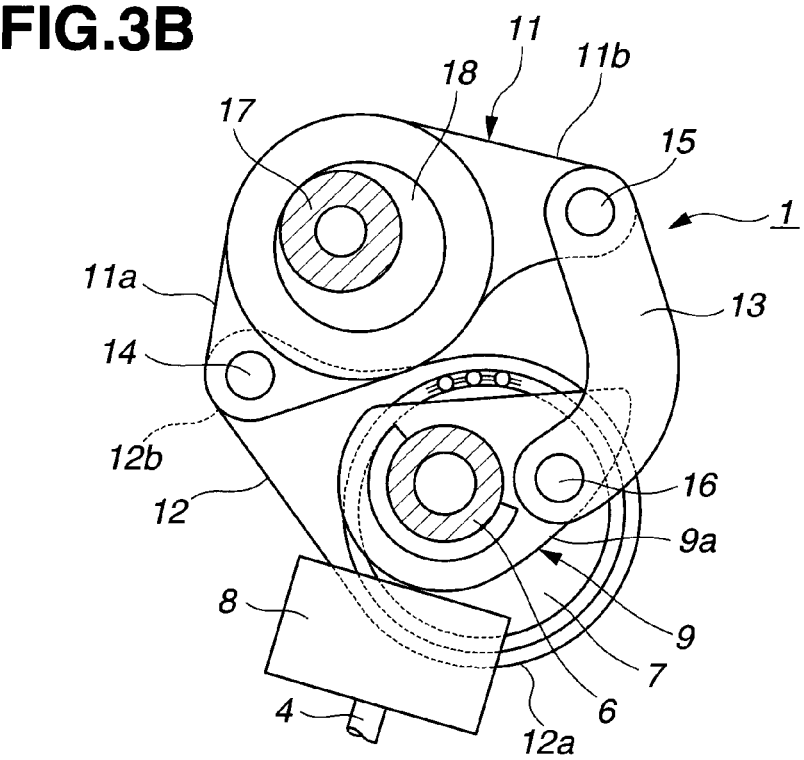

When the engine operating point enters a high speed and high load region, electric motor 20 is further rotated in the other direction by the control signal from controller 22. Control shaft 17 further rotates control cam 18 in the counterclockwise direction, so that the axis is pivoted in the downward direction as shown in FIGS. 3A and 3B. Consequently, the entirety of rocker arm 11 is moved closer to drive shaft 6. Second end portion 11b of rocker arm 11 pushes the cam nose portion of swing cam 9 through link rod 13 in the downward direction, and the entirety of swing cam 9 is pivoted in the clockwise direction by a predetermined quantity.

Figure 4:
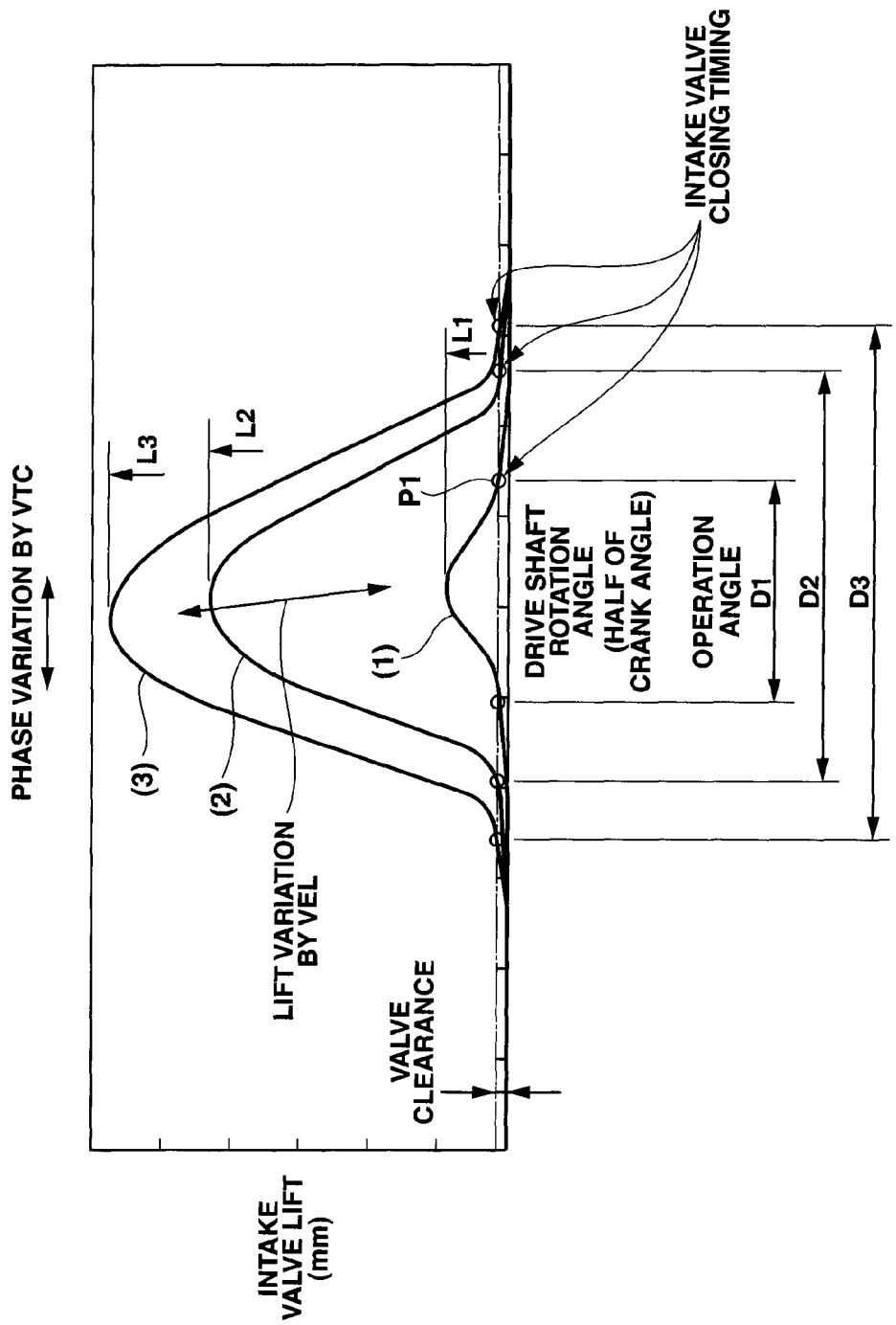
FIG. 4 is a characteristic view showing a valve lift quantity, an operation angle and a valve timing of an intake valve.

Accordingly, drive cam 7 rotates and pushes up first end portion 11a of rocker arm 11 through the link arm 12. A movement for valve lift is transmitted through link rod 13 to swing cams 9 and valve lifers 8. In this case, the valve lift quantity increases continuously from L2 to L3 as shown in FIG. 4. Consequently, this system can improve the intake charging efficiency and the engine output in the high speed region.

That is, the lift quantity of each intake valve 4 is continuously varied from small lift L1 to large lift L3 in accordance with the driving state of the engine. Accordingly, the operation angle of each intake valve 4 is continuously varied from small operation angle D1 to large operation angle D3.

When the engine is at rest, the motor is not energized so that the motor torque is not generated. Accordingly, ball nut 24 is stably held in the central position, that is, in medium operation angle D2 and medium lift L2 region, by the spring forces of the first and second coil springs 30 and 31 which confronts each other. Consequently, the closing timing of each intake valve 4 is set near the bottom dead center of the piston.

Figure 5:
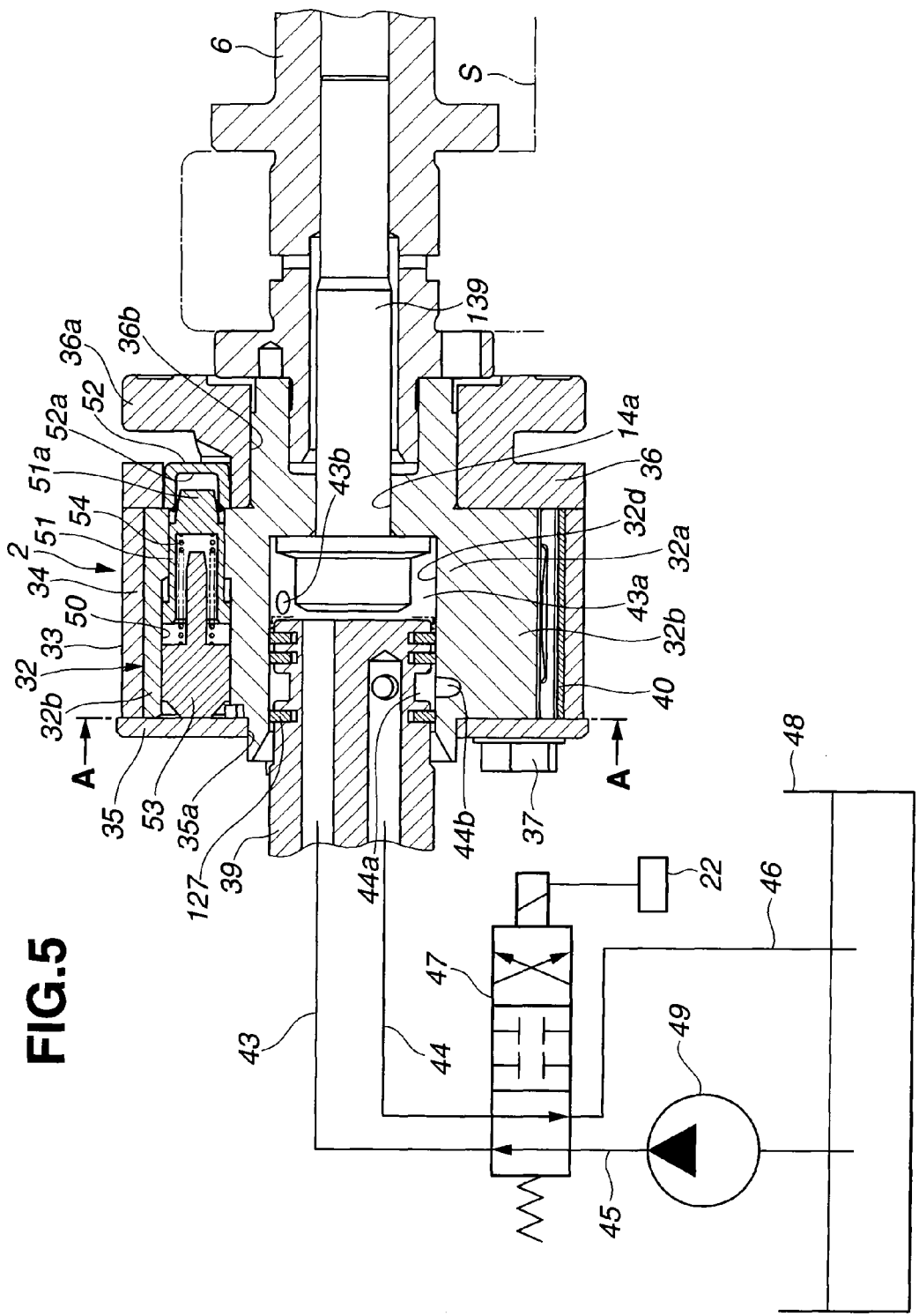
FIG. 5 is a longitudinal sectional view showing an intake VTC in the variable valve actuating apparatus of FIG. 1.
Figure 6:
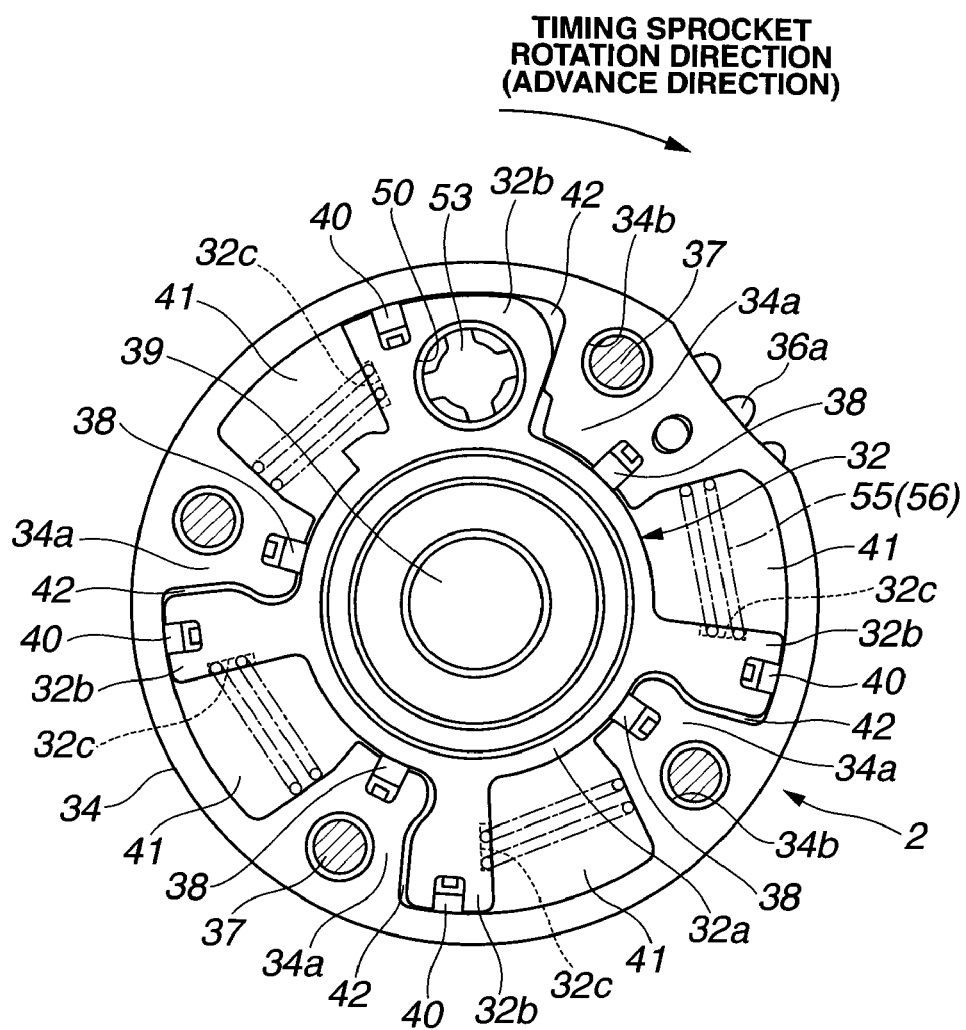
FIG. 6 is a longitudinal sectional view which is taken along a section line A-A of FIG. 5, and which shows the intake VTC in a most advanced state.
Figure 7:
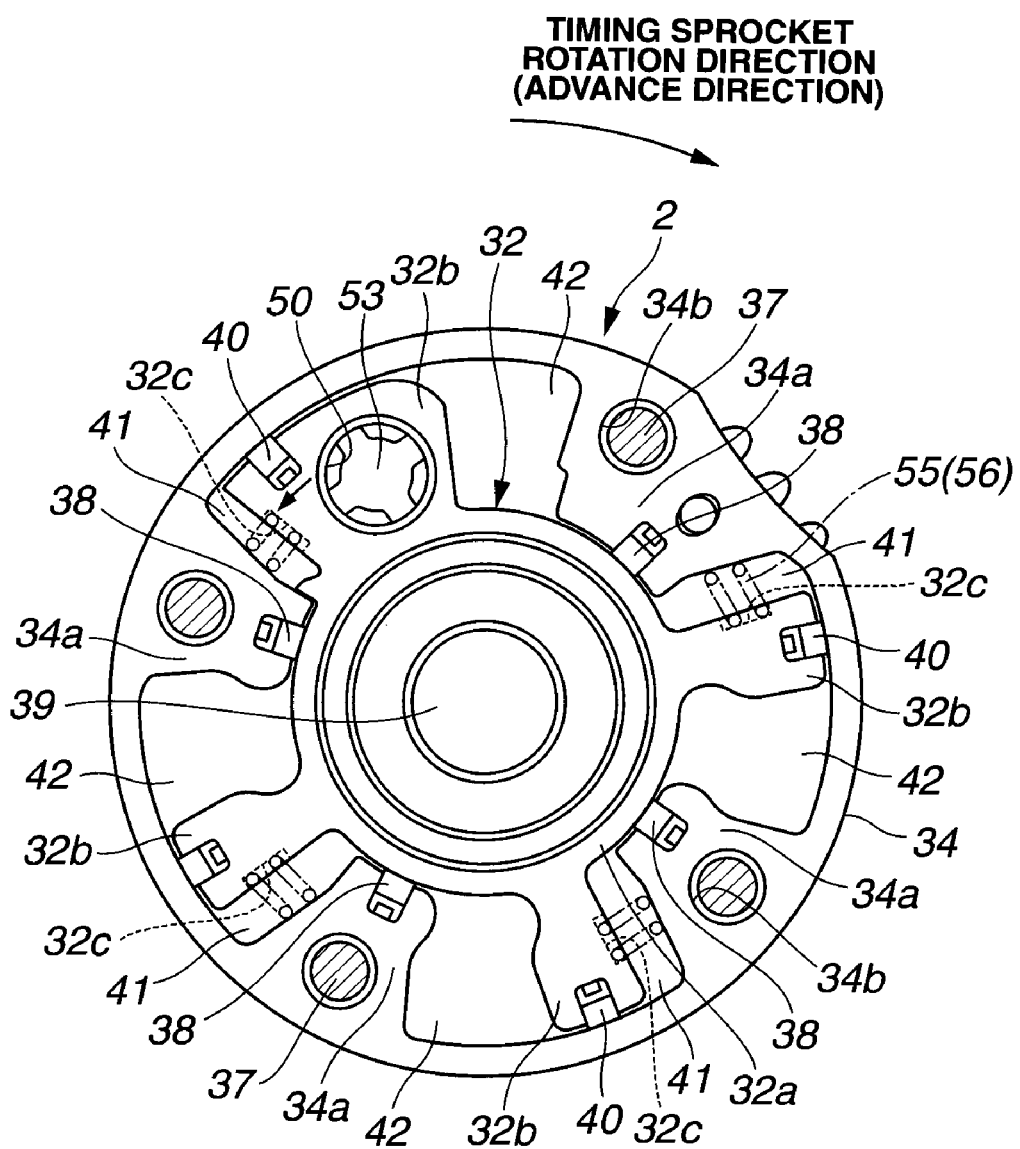
FIG. 7 is a longitudinal sectional view which is taken along the section line A-A of FIG. 5, and which shows the intake VTC in a most retarded state.

FIG. 5 is a longitudinal sectional view showing an intake VTC in the variable valve actuating apparatus of FIG. 1. FIG. 6 is a longitudinal sectional view which is taken along a section line A-A of FIG. 5, and which shows the intake VTC in a most advanced state. FIG. 7 is a longitudinal sectional view which is taken along the section line A-A of FIG. 5, and which shows the intake VTC in a most retarded state. As shown in FIGS. 5 and 6, intake VTC 2 is a vane type including timing sprocket 33 arranged to be driven and rotated by the crank shaft of the engine, and to transmit the rotational driving force to drive shaft 6; a vane member 32 fixed to an end portion of drive shaft 6, and rotatably received within timing sprocket 33; and a hydraulic circuit arranged to rotate vane member 32 in the forward or reverse direction by the hydraulic pressure.

Timing sprocket 33 includes a housing 34 receiving vane member 32 rotatably; a front cover 35 shaped like a circular disk, and arranged to close a front end opening of housing 34; and a rear cover 36 shaped approximately like a circular disk, and arranged to close a rear end opening of housing 34. Housing 34 is sandwiched between front and rear covers 35 and 36, and joined with these covers to form a unit, by four small diameter bolts 37 extending in the axial direction of drive shaft 6.

Housing 34 is in the form of a hollow cylinder having the front and rear openings. Housing 34 includes a plurality of shoes 34a projecting radially inwards from the inner circumferential surface, and serving as a partition. In this example, four of the shoes 34a are arranged at intervals of about 90 degrees in the circumference direction.

Each of shoes 34a has a substantially trapezoidal cross section. Each of shoes 34a includes a bolt insertion hole 34b which is located at a substantially central position of the shoe 34a, which penetrates in the axial direction, and which receives the shank of one of bolts 37. Each of shoes 34a includes a radially inner end surface having a retaining groove which extends axially in the form of cutout. A U-shaped seal member 38 is fit in each retaining groove, and urged radially inwards by a leaf spring (not shown) fit in the retaining groove.

Front cover 35 is shaped like the circular disk. Front cover 35 includes a support hole 35a which is formed at a substantially central portion of front cover 35, and which has a relatively large inside diameter. Front cover 35 includes four bolt holes (not shown) arranged around the support hole 35a, and facing respective ones of the bolt holes 34b of shoes 34a.

Rear cover 36 includes a toothed portion 36a formed integrally on the rear side, and arranged to engage with the before-mentioned timing chain; and a bearing hole 36b which is located in a substantially central position, which has a relatively large inside diameter, and which penetrates in the axial direction.

Vane member 32 includes an annular vane rotor 32a having a bolt insertion hole located in a substantially central position; and four vanes 32b integrally provided with vane rotor 32a, located on the outer circumference surface of vane rotor 32a, and arranged at intervals of about 90 degrees in the circumferential direction.

Vane rotor 32a includes a front side small diameter tubular portion (on the left side of FIG. 5) rotatably supported by support hole 35a of front cover 35, and a rear side small diameter tubular portion (on the right side of FIG. 5) rotatably supported by bearing hole 36b of rear cover 36.

Vane member 32 is fixed to the front end of drive shaft 6 by a fixing bolt 139 extending axially through the center bolt hole of vane rotor 32a.

Three of four vanes 32b are smaller vanes shaped approximately like a relatively long rectangle, and the remaining one is a larger vane shaped like a relatively large trapezoid. The smaller vanes 32b are approximately equal in circumference width whereas the larger vane 32b has a larger circumferential width greater than that of each of the smaller vanes 32b so that a weight valance is attained as a whole of vane member 32.

The four vanes 32b of vane member 32 and the four shoes 34a of housing 34 are arranged alternately in the circumferential direction around the center axis, as shown in FIGS. 6 and 7. Each vane 32b includes an axially extending retaining groove receiving a U-shaped seal member 40 in sliding contact with the inner cylindrical surface of housing 34, and a leaf spring (not shown) for urging the seal member 40 radially outwards and thereby pressing the seal member 40 to the inner cylindrical surface of housing 34. Moreover, in one side of each vane 32b facing in the direction opposite to the rotational direction of drive shaft 6, there are formed two circular recesses 32c.

An advance fluid pressure chamber 41 and a retard fluid pressure chamber 42 are formed, respectively, on both sides of each vane 32b. Accordingly, there are four of the advance fluid pressure chambers 41 and four of the retard fluid pressure chambers 42.

The hydraulic circuit includes a first fluid passage 43 leading to the advance fluid pressure chamber 41 to supply and drain an advance fluid pressure of the hydraulic fluid to and from advance fluid pressure chambers 41; a second fluid passage 44 leading to the retard fluid pressure chambers 42 to supply and drain a retard fluid pressure of the hydraulic fluid to and from retard fluid pressure chambers 42; and a directional control valve or selector valve 47 connecting first fluid passage 43 and second fluid passage 44 selectively with a supply passage 45 and a drain passage 46. A fluid pump 49 is connected with supply passage 45, and arranged to draw the hydraulic fluid or oil from an oil pan 48, and to force the fluid into supply passage 45. Pump 49 is a one-way type pump. A downstream end of drain passage 46 is connected to oil pan 48, and arranged to drain the fluid to oil pan 48.

First and second fluid passages 43 and 44 include sections formed in a cylindrical portion 39 which is inserted, from a first end, through the front side small diameter tubular portion of vane rotor 32a, into the support hole 32d of vane rotor 32a. A second end of the cylindrical portion 39 is connected with directional control valve 47.

Between the outer circumferential surface of the cylindrical portion 39 and the inner circumferential surface of support hole 32d, there are provided three annular seal members 127 fixedly mounted on the cylindrical portion 39 near the forward end and arranged to seal the first and second fluid passages 43 and 44 off from each other.

First fluid passage 43 includes a passage section 43a serving as a pressure chamber, and four branch passages 43b connecting the passage section 43a, respectively, with the four advance fluid pressure chambers 41. Passage section 43a is formed in an end portion of support hole 32d on the side of drive shaft 6. The four branch passages 43b are formed in vane rotor 32a and extend radially in vane rotor 32a.

Second fluid passage 44 includes an axially extending passage section extending axially in the cylindrical portion 39 to a closed end; an annular chamber 44a formed around the axially extending passage section near the closed end; and an L-shaped passage section 44b connecting the annular chamber 44a with each retard fluid pressure chamber 42.

Directional control valve 47 of this example is a solenoid valve having four ports and three positions. A valve element inside the directional control valve 47 is arranged to alter the connection between first and second fluid passages 43 and 44 and the supply and drain passages 45 and 46 under the control of the controller 22. When directional control valve 47 is controlled to be in its neutral position, then no hydraulic fluid is supplied to both of advance fluid pressure chamber 41 and retard fluid pressure chamber 42, and accordingly vane member 32 is fixed.

Controller 22 of this example is a common control unit or control section used for controlling all of the intake VEL 1, the intake VTC 2, and the exhaust VTC 3. Controller 22 senses the engine driving state. Controller 22 senses a relative rotational position between timing sprocket 33 and drive shaft 6 by signals from crank angle sensor 27 and drive shaft angle sensor 28.

When directional control valve 47 is switched to the neutral position (center position), the hydraulic fluid is not positively supplied to advance chamber 41 and retard chamber 42 to hold the position of vane member 32

The intake VTC 2 includes a lock mechanism disposed between vane member 32 and housing 34 for locking or allowing the rotation of vane member 32 with respect to housing 34. Specifically, this lock mechanism is disposed between rear cover 36 and the larger vane 32b. The lock mechanism includes a slide hole 50, a lock pin 51, a lock recess 52a, a spring retainer 53, and a coil spring 54. Slide hole 50 is formed in the larger vane 32b, extending in the axial direction of drive shaft 6. Lock pin 51 is disposed in slide hole 50, and slidably supported on slide hole 50. Lock recess 52a is formed in a portion 52 which is cup-shaped, and which is fixed to a hole defined in rear cover 36. Lock recess 52a is arranged to receive a tip portion 51a of lock pin 51. The tip portion 51a is tapered. Spring retainer 53 is fixed to a bottom portion of slide hole 50. Coil spring 54 is retained by spring retainer 53, and arranged to bias the lock pin 51 toward the lock recess 52a.

The lock recess 52a is hydraulically connected to advance fluid pressure chamber 41 or pump 49 through a fluid passage (not shown), and receives the hydraulic pressure in advance fluid pressure chamber 41 or the discharge pressure of the oil pump.

When vane member 32 is in its most advanced position with respect to housing 34, the lock pin 51 is biased by coil spring 54 toward lock recess 52a so that the tip portion 51a of lock pin 51 is fit in lock recess 52a. The relative rotation between timing sprocket 31 and drive shaft 6 is thus locked. When lock recess 52a receives the hydraulic pressure in advance fluid pressure chamber 41 or the discharge pressure of the oil pump 49, then lock pin 51 moves away from lock recess 52a, so as to release drive shaft 6 with respect to timing sprocket 33.

Between one side surface of each vane 32b and a confronting side surface 34c of an adjacent one of the shoes 34a, there are disposed a pair of coil springs 55 and 56 serving as biasing means for urging the vane member 32 in the advance rotational direction. In other words, coil springs 55 and 56 serve as a biasing device arranged to bias the intake VTC 2 in a direction to advance the opening timing and the closing timing of intake valves 4.

Though the two coil springs 55 and 56 are overlapped in FIGS. 6 and 7, the two coil springs 55 and 56 extend separately in parallel to each other. The two coil springs 55 and 56 have an equal axial length (coil length) which is longer than the spacing between the one side surface of the corresponding vane 32b and the confronting side surface 34c of the adjacent shoe 34a. The two coil springs 55 and 56 are spaced with such an interaxis distance that the springs 55 and 56 do not contact each other even when the springs 55 and 56 are compressed to the maximum extent. The two coil springs 55 and 56 are connected through a retainer (not shown) shaped like a thin sheet and fit in the recesses 32c of the corresponding shoe 34a.

The thus-constructed intake VTC 2 is controlled to operate as follows. At the time of stop of the engine, the controller 22 stops the output of the control current to directional control valve 47, so that the valve element of directional control valve 47 is mechanically placed in a default position as shown in FIG. 5 so as to allow fluid communication between supply passage 45 and first fluid passage 43 on the advance side. At the time of stop of the engine, the supplied fluid pressure is equal to zero, because oil pump 49 is also inoperative.

Accordingly, vane member 32 is biased by coil springs 55, 56, so as to rotate in the clockwise direction about the axial direction of drive shaft 6 as viewed in FIG. 6. As a result, vane member 32 is brought into a position such that the larger vane 32b is in contact with the confronting side surface of shoe 34a. Drive shaft 6 is thus in the most advanced position with respect to timing sprocket 33. Simultaneously, the tip portion 51a of lock pin 51 is inserted into lock recess 52a, so as to prevent drive shaft 6 from rotating with respect to timing sprocket 33. The intake VTC 2 is thus mechanically and stably held in its default position for most advanced intake valve opening timing IVO and intake valve closing timing IVC.

When the engine is started by turning on the ignition switch and cranking the crankshaft with a starter motor, then directional control valve 47 starts to receive a control signal from controller 22. However, immediately after the engine start, vane member 32 is still held in the most advanced position by means of the lock mechanism and coil springs 55, 56, because the discharge pressure of oil pump 49 is not yet sufficiently high.

At this moment, directional control valve 47 allows fluid communication between supply passage 45 and first fluid passage 43, and between drain passage 46 and second fluid passage 44, by the control signal outputted from controller 22. Then, the oil pressure from oil pump 49 is raised and supplied through first fluid passage 43 to advance fluid pressure chambers 41, while the retard fluid pressure chambers 42 are held in a low pressure state in which no oil pressure is supplied, and the oil pressure is drained through drain passage 46 into oil pan 48, like at the time of stop of the engine.

After the discharge pressure of oil pump 49 is increased sufficiently, the controller 22 can control the position of vane member 32 by means of directional control valve 47. For example, when the engine enters the low speed and partial load region after warmed up, the directional control valve 47 is controlled to allow fluid communication between supply passage 45 and second fluid passage 44 and between drain passage 46 and first fluid passage 43. Accordingly, the oil pressure discharged by pump 49 is supplied through second fluid passage 44 to retard fluid pressure chamber 42, while the oil pressure is drained from advance fluid pressure chamber 41 through first fluid passage 43 and drain passage 46 to oil pan 48 so that advance fluid pressure chamber 41 remains in a low-pressure state.

The oil pressure is supplied to lock recess 52a as well as retard fluid pressure chamber 42, so that lock pin 51 moves back against the biasing force of coil spring 54, and the tip portion 51a moves out of lock recess 52a. Accordingly, vane member 32 is unlocked with respect to housing 34, and is rotated in the counterclockwise direction by the increased pressures in retard fluid pressure chambers 42, against the spring forces of coil springs 55 and 56, as viewed in FIG. 6. Consequently, drive shaft 6 rotates to the retard side relative to timing sprocket 33, retarding the intake valve opening timing IVO and intake valve closing timing IVC.

When the engine enters a predetermined low speed and middle load region thereafter, then the controller 22 operates the directional control valve 47 to the position connecting the supply passage 45 with first fluid passage 43 and connecting the drain passage 46 with second fluid passage 44.

Therefore, the oil pressure in retard fluid pressure chambers 42 is decreased by return through second fluid passage 44 and drain passage 46 to oil pan 48, whereas the oil pressure in advance fluid pressure chambers 41 is increased by supply of the oil pressure.

Consequently, vane member 32 rotates in the clockwise direction by the high pressure in advance fluid pressure chambers 41 and the spring forces of coil springs 55 and 56, and thereby shifts the relative rotational phase of drive shaft 6 relative to timing sprocket 33 to the advance side.

When the engine enters a predetermined middle and high speed region from the low speed region, the oil pressure in advance fluid pressure chambers 41 decreases, the oil pressure in retard fluid pressure chambers 42 increases, and hence the vane member 32 shifts the relative rotational phase of drive shaft 6 relative to timing sprocket 33 to the retard side, against the spring forces of coil springs 55 and 56, as shown in FIG. 7. Then, directional control valve 47 is controlled to be in its neutral position, so that the vane member 32 is fixed relative to housing 34.

Figure 8:
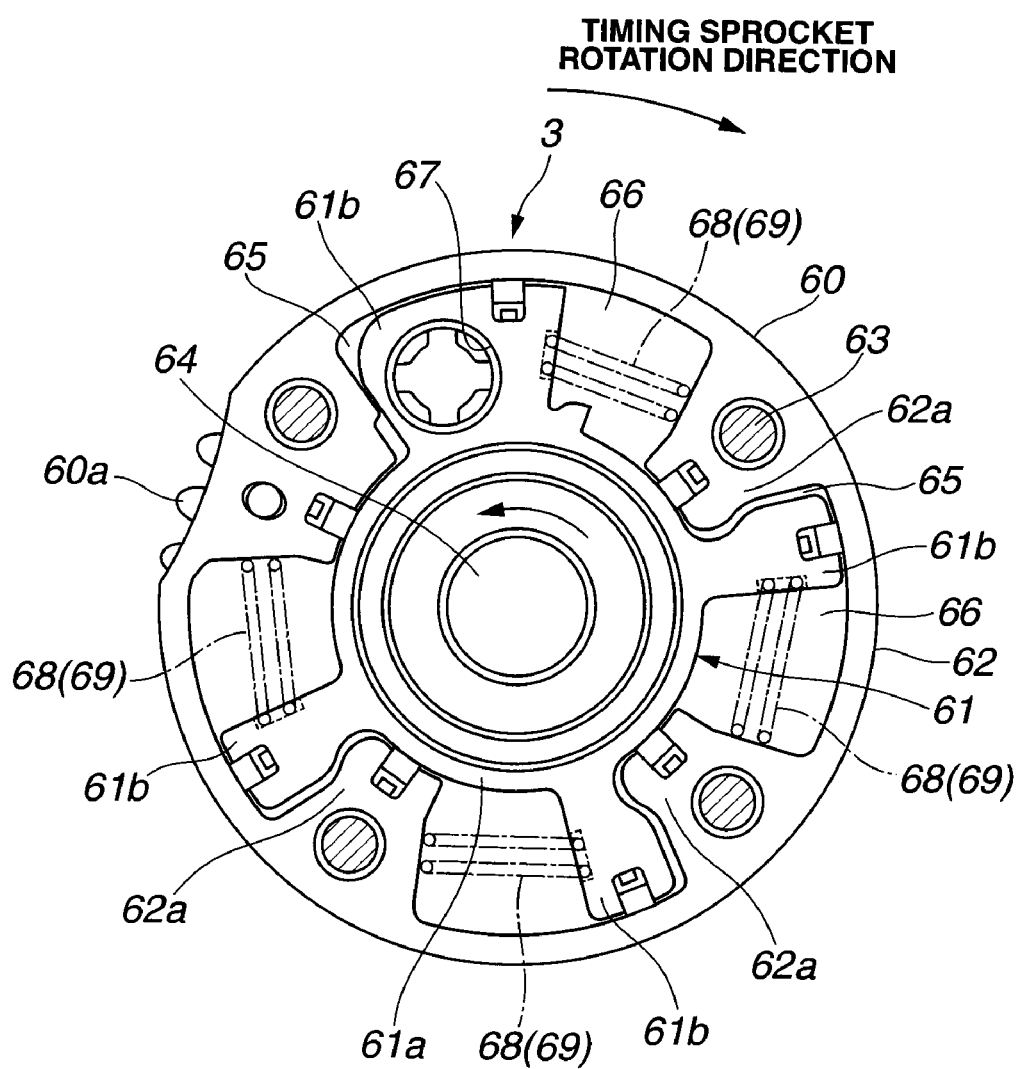
FIG. 8 is a front view showing an exhaust VTC in the variable valve actuating apparatus of FIG. 1, from which a front cover is removed, and which is in a most retarded state.

FIG. 8 is a front view showing exhaust VTC 3 from which a front cover is removed. As shown in FIG. 8, the exhaust VTC 3 of this example is of a vane type like the intake VTC 2. The exhaust VTC 3 includes a timing sprocket 60 disposed at one end of an exhaust cam shaft (not shown), and arranged to receive a rotational driving force from the crank shaft; a vane member 61 received rotatably in the timing sprocket 60; and a hydraulic circuit to rotate vane member 61 in the forward and reverse directions by the use of an oil pressure.

Timing sprocket 60 includes a housing 62 receiving the vane member 61 rotatably, a front cover (not shown), and a rear cover (not shown). Housing 62 is sandwiched between the front and rear covers, and joined with these covers to form a unit, by four small diameter bolts 63 extending in the axial direction of drive shaft 6. Housing 62 is in the form of a hollow cylinder having the front and rear openings. Housing 62 includes a plurality of shoes 62a projecting radially inwards from the inner circumferential surface and serving as a partition. In this example, four of the shoes 62a are arranged at intervals of about 90 degrees. The rear cover includes a toothed portion 60a formed integrally on an outer circumference surface, and arranged to engage with a timing chain, as in the case of the intake VTC 2.

Vane member 61 includes an annular vane rotor 61a having a bolt insertion hole located in a substantially central position; and four vanes 61b integrally formed on the outer circumference surface of vane rotor 61, and arranged at intervals of about 90 degree in the circumference direction.

Vane rotor 61a is fixed to the front end of the exhaust cam shaft by a fixing bolt 64 extending axially through the center bolt hole of vane rotor 61a. An advance fluid pressure chamber 65 and a retard fluid pressure chamber 66 are formed, respectively, on both sides of each vane 61b. Accordingly, there are four of the advance fluid pressure chambers 65 and four of the retard fluid pressure chambers 66.

The hydraulic circuit of the exhaust VTC 3 has a construction identical to the construction of the hydraulic circuit of the intake VTC 2, except that an directional control valve corresponding to directional control valve 47 has three positions reversed with respect to a vertical line as viewed in FIG. 5. The hydraulic circuit includes a first fluid passage leading to the advance fluid pressure chambers 65 to supply and drain an advance fluid pressure of the hydraulic fluid to and from advance fluid pressure chambers 65; a second fluid passage leading to the retard fluid pressure chambers 66 to supply and drain a retard fluid pressure of the hydraulic fluid to and from retard fluid pressure chambers 66; and the directional control valve connecting the first fluid passage and second fluid passage selectively with a supply passage and a drain passage.

A valve element inside the directional control valve is arranged to alter the connection between the first and second fluid passages and the supply and drain passages under the control of the controller 22.

The directional control valve of the exhaust VTC 3 is arranged to connect the supply passage to the second fluid passage leading to the retard fluid pressure chambers 66, and to connect the drain passage to the first fluid passage leading to advance fluid pressure chambers 65, when no control current is supplied to the directional control valve. The directional control valve includes a coil spring arranged to mechanically bias the valve element toward this default position.

The exhaust VTC 3 includes a lock mechanism disposed between vane member 61 and housing 62 for locking or allowing the rotation of vane member 61 with respect to housing 62. Specifically, this lock mechanism is disposed between the rear cover 36 and the larger vane 61b. The lock mechanism includes a lock pin 67, a lock recess, a spring retainer, and a coil spring, similarly as in the case of the intake VTC 2. When the engine is at rest, and the vane member 61 is located in the most retarded position as shown in FIG. 8, then the lock pin 67 is inserted and fitted in the lock recess under the biasing force of the coil spring, so as to prevent the vane member 61 from rotating relative to housing 62, and thus stably hold the vane member 61.

Between one side surface of each vane 61b and a confronting side surface of an adjacent one of the shoes 62a, there are disposed a pair of coil springs 68 and 69 serving as biasing means for urging the vane member 61 in the retard rotational direction. In other words, coil springs 68 and 69 serve as a biasing device arranged to bias the exhaust VTC 3 in a direction to retard the exhaust valve opening timing EVO and exhaust valve closing timing EVC. When the oil pump supplies no hydraulic pressure or a lower hydraulic pressure below a predetermined level, for example, when the engine is at rest, or immediately after the engine is started, then the vane member 61 is biased in the counterclockwise direction as viewed in FIG. 8, so as to rotate the exhaust camshaft to the most retarded position. That is, the most retarded position is a default position of exhaust VTC 3.

Hereinafter, operations of the control apparatus according to the embodiment is illustrated.

Figure 9:
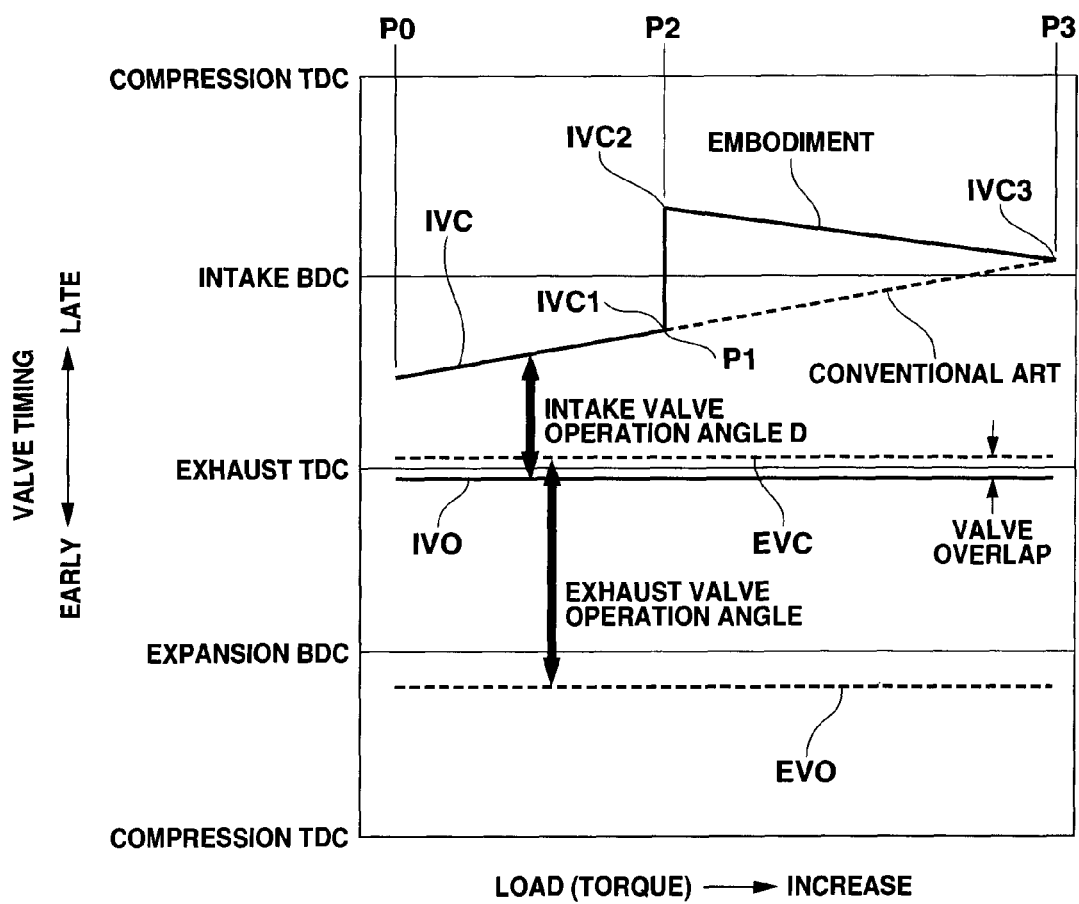
FIG. 9 is a characteristic view showing a relationship between a load and the valve timing in the variable valve actuating apparatus of FIG. 1.
Figure 10:
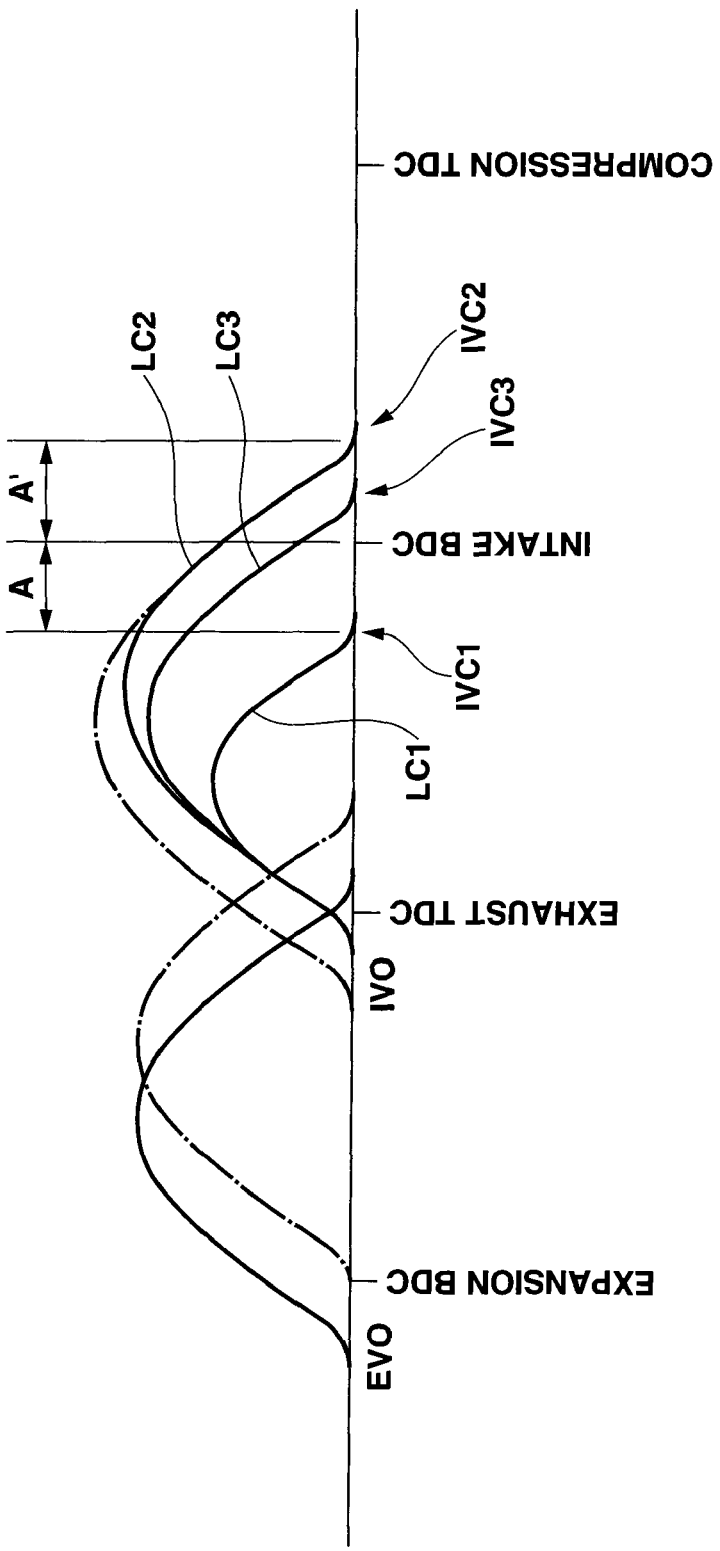
FIG. 10 is a lift characteristic view showing a closing timing from the operation angle and the lift quantity of the intake valve in the variable valve actuating apparatus of FIG. 9.

FIG. 9 is a characteristic view showing a relationship between a load and the valve timing in the variable valve actuating apparatus according to the first embodiment. FIG. 10 is a lift characteristic view showing a closing timing from the operation angle and the lift quantity of the intake valve in the variable valve actuating apparatus of FIG. 9. The variation of the opening and closing timings (valve timing) of each intake valve 4 when the load (torque) is gently increased at the low speed is illustrated below with reference to FIGS. 9 and 10. The variation of the load is determined by the variation of the accelerator opening.

In a light load region such as an idle from no load state P0 to a predetermined low load P1, a closing timing (IVC) of intake valve 4 is sufficiently advanced from (before) the piston bottom dead center of the intake stroke. In this case, the throttle valve is held in a large opening degree which is nearly full opening.

The IVC of intake valve 4 is retarded as the load increases from no load P0 to P1 to increase the intake air quantity, so that the torque (load) is increased. This operation is a valve throttling (throttling by the valve) without depending on the throttle valve.

The torque is controlled by controlling IVC before the bottom dead center, that is, the intake stroke. Accordingly, the internal pressure of the intake pipe is increased to a value identical to the atmospheric pressure, combined with the large opening of the throttle valve, to a value identical to the atmospheric pressure.

Accordingly, it is possible to considerably decrease the pumping loss, and thereby to improve the fuel consumption. Moreover, when the IVC is advanced before (earlier than) the bottom dead center, the operation angle and the lift quantity of intake valve 4 become small as shown in a lift curve (LC1) of FIG. 10. Therefore, it is possible to decrease the friction of the valve operating system, and to thereby to further improve the fuel consumption.

The IVC is controlled to be held constant by cooperation of intake VEL 1 and intake VTC 2. Therefore, it is possible to suppress the variation of the internal EGR (residual gas), and thereby to attain the stable torque control.

When the load becomes a predetermined partial load (low and middle load) larger than P1, it is hard to generate uniform air-fuel mixture in the cylinder as the fuel injection quantity increases. The combustion may be deteriorated. Specifically, this is notable in a direct fuel-injection engine. Moreover, in a region in which the IVC is advanced before (earlier than) the bottom dead center, a time period from closing intake valve 4 to the top dead center of the piston of the compression stroke is long. The gas motion within the cylinder is attenuated in the vicinity of the ignition timing. Consequently, it is hard to generate the uniform air-fuel mixture, and the combustion is deteriorated in the partial load region in which the fuel injection quantity increases. Therefore, the fuel consumption may be deteriorated, and the exhaust emission performance may be decreased.

In this embodiment, when the load exceeds load P1 and becomes the load P2, controller 22 controls intake VEL 1 to increase the lift quantity and the operation angle of intake valve 4. That is, controller 22 largely controls as shown in the lift curve (LC2) of FIG. 10, so that the IVC is varied from IVC1 before the bottom dead center, to IVC2.

Consequently, the time period from the closing timing of intake valve 4 to the compression top dead center is decreased. The engine reaches the ignition timing before the gas motion is attenuated. Accordingly, it is possible to suppress the deterioration of the combustion. Moreover, the gas motion is not attenuated. Therefore, it is possible to further uniformize the air-fuel mixture, and thereby to further improve the combustion.

Moreover, a part of the air-fuel mixture inhaled into the cylinder is again returned to the intake pipe since IVC2 is retarded. The returned air-fuel mixture is mixed with the flesh air so as to further uniformize the air-fuel mixture. The returned air-fuel mixture and the flesh air are stirred, and inhaled into the cylinder in a next cycle. Therefore, it is possible to promote the uniformity or evenness of the air-fuel mixture in the next cycle, and thereby to further improve the combustion.

In IVC2 of intake valve 4, it is possible to decrease the pumping loss identical to the pumping loss in IVC1 in addition to the combustion improving effect. That is, in IVC1 (early closing), intake valve 4 is closed before the bottom dead center under the high internal pressure of the intake pipe. Accordingly, that intake stroke of the piston is shortened (decreased), and the charging quantity of the intake air to the cylinder is controlled so as to decrease the pumping loss. On the other hand, in IVC2 (later closing), intake valve 4 is closed after the bottom dead center under the identical high internal pressure of the intake pipe so as to increase the reverse flow to the intake pipe. Consequently, it is possible to decrease the pumping loss by controlling the charging quantity of the intake air. Therefore, it is possible to decrease the pumping loss, like in IVC1 as mentioned above.

Next, a case in which a torque in IVC1 (early closing) is identical to a torque in IVC2 (later closing) is illustrated below.

At the extremely low engine speed, the charging efficiency of the intake air is maximized when the IVC is at the bottom dead center.

In a case in which IVC1 on the early closing side is at A degree before the bottom dead center, IVC2 on the later closing side is A degree after the bottom dead center to attain the intake charging efficiency identical to the intake charging efficiency when IVC1 is at A degree before the bottom dead center. Accordingly, these IVC1 and IVC2 are set in a region from the idle engine speed to 1000 rpm.

However, at the engine speed of, for example, 2000 rpm, there is a slight intake gas motion delay to the cylinder (intake air inertia). The charging efficiency is not maximized when the IVC is at the bottom dead center. The charging efficiency is maximized at a timing which is retarded slightly by $\Delta$ from the bottom dead center. Accordingly, when IVC1 is at A degree before the bottom dead center, IVC2 on the retarded closing side is a timing (A' (A+2$\Delta$) degree after the bottom dead center) which is retarded slightly by 2$\Delta$ from A degree after the bottom dead center to attain the charging efficiency identical to the charging efficiency when IVC1 is at A degree before the bottom dead center.

Accordingly, when IVC1 on the early closing side is at A degree before the bottom dead center, IVC2 on the later closing side is A' degree after the bottom dead center to obtain the torque identical to the torque in IVC1.

Lift curves LC1 and LC2 shown in FIG. 10 correspond, respectively, to IVC1 and IVC2. Lift curves LC1 and LC2 are shown by actual valve lift curves which are obtained by subtracting the valve clearance quantity from the cam lift quantity.

Figure 11:
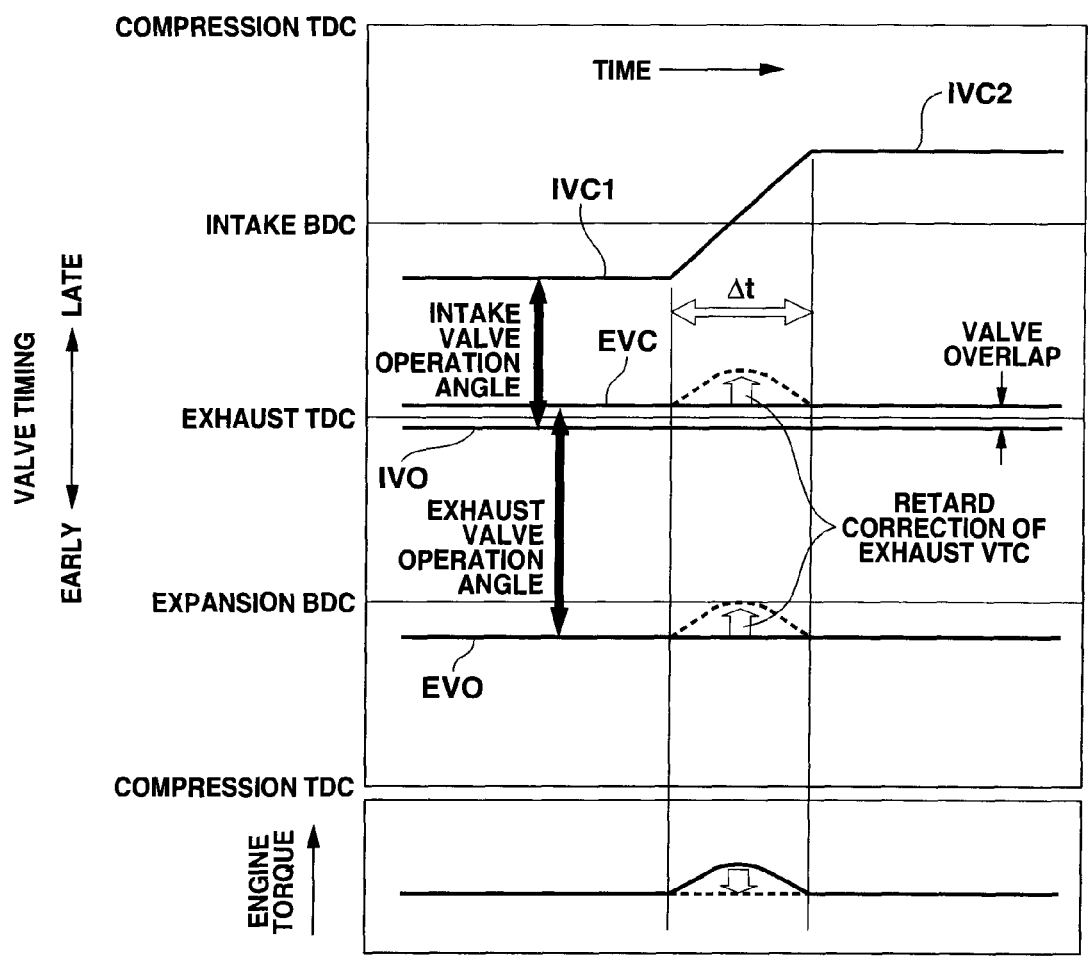
FIG. 11 is a time chart of IVC in a predetermined load region in the variable valve actuating apparatus of FIG. 1.

FIG. 11 is a time variation of IVC in the vicinity of the predetermined low load P1. The intake valve opening timing suddenly varies from IVC1 to IVC2 during $\Delta t$ after the load reaches the load P1. FIG. 11 shows the transient variation. A horizontal axis of FIG. 11 represents a time.

When the intake valve closing timing varies from IVC1 to IVC2, the intake valve closing timing passes through the bottom dead center. In this case, the intake charging efficiency increases, and the torque of the engine transiently increases.

The increase of the transient torque is absorbed by deflection or deformation of the transmitting system in which the engine torque is transmitted to the tire since $\Delta t$ is extremely short. However, the driver may feel the slight torque shock.

Controller 22 performs a transient torque reduction control (to decrease a transient torque of the engine) to retard the closing timing (EVC) of the exhaust valve by the exhaust VTC3 for a moment, so as to increase the valve overlap between intake valve 4 and the exhaust valve for a moment. By so doing, the internal EGR (residual gas in the cylinder) is increased. Therefore, the transient torque is decreased, and the torque variation is suppressed as shown by a broken line of FIG. 11. Consequently, it is possible to further decrease the torque shock.

In a case in which the transient torque is decreased and corrected by the increase of the internal EGR, it is possible to suppress the deterioration of the fuel consumption and the reduction of the exhaust emission performance during the transient period.

Moreover, a lean correction of the air-fuel mixture may be performed for a moment as another transient torque reduction control. In this case, it is possible to improve the fuel consumption during the transient period.

Furthermore, the throttle valve may be temporarily throttled for the correction for a moment. By so doing, it is possible to suppress the deterioration of the combustion during the transient period.

Moreover, the ignition timing of the spark plug may be temporarily corrected to the retarded side. By so doing, it is possible to accurately perform the torque reduction correction without the response delay.

As shown in FIG. 9, the IVC is advanced from IVC2 to IVC3 when the load further increases after the load exceeds P1 and becomes the low and middle load region of P2, and the intake air charging efficiency (torque) increases. The IVC becomes IVC3 at high load P3, and the intake valve closing timing is slightly retarded from (after) the bottom dead center. Accordingly, it is possible to sufficiently increase the charging efficiency.

In the conventional apparatus, the IVC linearly varies from P0 to P3 as shown in a broken line of FIG. 9. In this case, the combustion is deteriorated in the low and middle load region in which the load exceeds P1 and becomes P2. Moreover, the fuel consumption and the exhaust emission performance are deteriorated. Furthermore, the acceleration performance may be deteriorated. The charging efficiency in IVC1 is substantially identical to the charging efficiency in IVC2. However, in case of IVC1, the operation angle and the lift quantity are small, so that the lift time area becomes small. The increase of the lift time area is needed at the sudden increase of the rotation. It takes long time for the increase of the lift time area, and the output (torque) tends to be deficient.

On the other hand, in this embodiment, IVC2 is the late closing. The operation angle and the lift quantity are originally large, and the lift time area is sufficiently large. Accordingly, it is possible to switch the valve timing, in a short time, to a valve timing suitable for the high speed region. Therefore, the response of the acceleration is improved. Moreover, in this case, the operation angle and the lift quantity are switched in the decreasing direction. This switching response is improved.

It is because intake VEL1 is mechanically stabilized by the spring reaction force in the decreasing direction of the operation angle and the lift quantity. Accordingly, the response in the decreasing direction is improved. Therefore, it is possible to further improve the response of the acceleration.

Moreover, in this embodiment, the two intake valves 2 have an identical lift curve. Accordingly, the swirl and the intake air loss do not generate in the high speed region. Therefore, it is possible to sufficiently increase the intake charging efficiency, and thereby to further increase the output and the torque.

In a case in which the two intake valves 4 have different lift curves, the intake charging efficiency is slightly deteriorated in the high speed region. However, it is possible to further improve the combustion in the partial load and the low and middle load by the swirl. Accordingly, it is possible to further improve the fuel consumption.

Next, the high load region of the engine is illustrated. In the low and middle load in which the use frequency is high, the deterioration of the uniformity of the air-fuel mixture causes the deteriorations of the fuel consumption and the exhaust emission performance. In this embodiment, IVC is retarded, and accordingly it is possible to improve the deteriorations of the fuel consumption and the exhaust emission performance. In the high load region in which the use frequency is low, the output torque which is an instantaneous force is more important than the fuel consumption.

As mentioned above, in this embodiment, it is possible to increase the output and the torque of the engine. In the high load region, the fuel injection quantity further increases in the high load region. Accordingly, it is inevitable to generate the unevenness of the air-fuel mixture. In the direct fuel-injection engine, the cooling effect in the cylinder increases with the increase of the fuel injection quantity. Therefore, the intake charging efficiency is further improved, and it is possible to further increase the torque and the output of the engine.

Accordingly, it is possible to increase geometrical compression ratio of the internal combustion engine, and thereby to increase the theoretical thermal efficiency. Moreover, it is possible to improve the output torque and the fuel consumption in an entire engine driving region.

Second Embodiment

Figure 12:
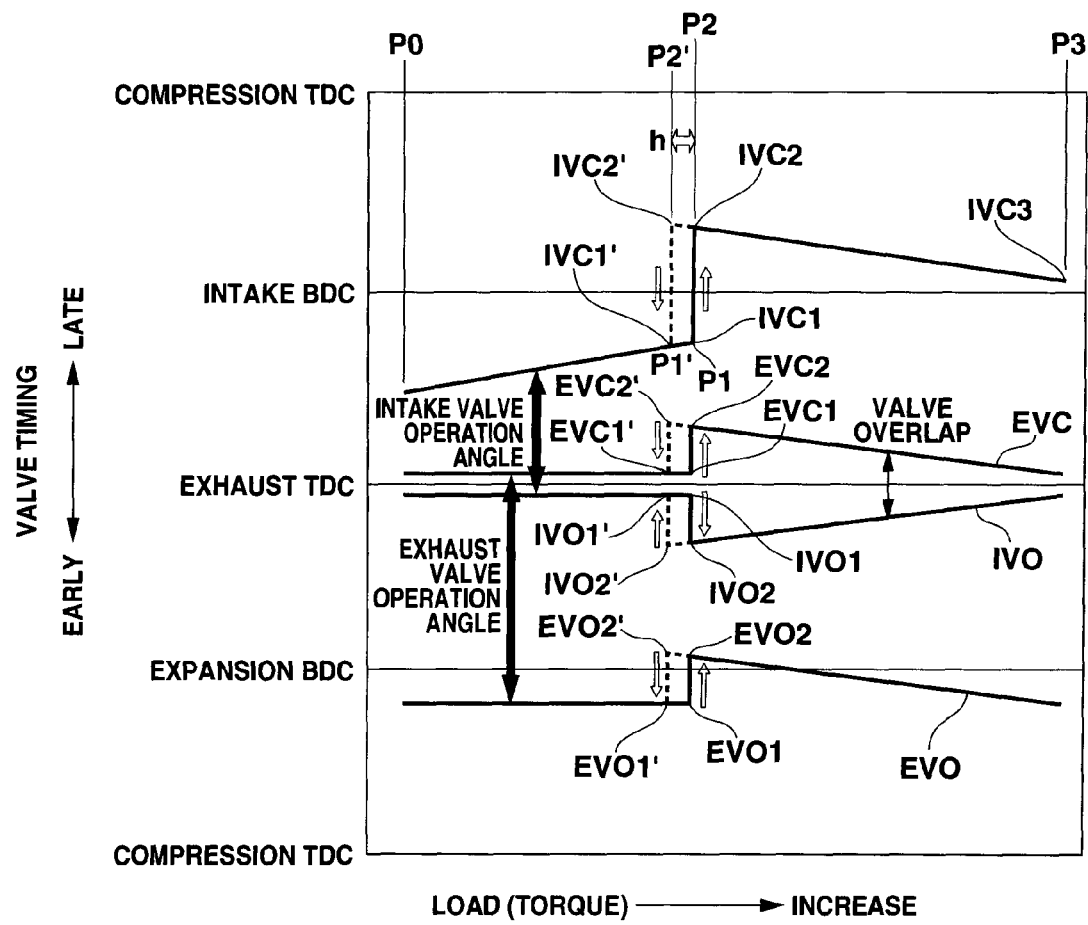
FIG. 12 is a characteristic view showing a relationship between the engine load and the valve timing in a variable valve actuating apparatus according to a second embodiment of the present invention.

FIG. 12 is a characteristic view showing a relationship between the engine load and the valve timing in a variable valve actuating apparatus according to a second embodiment of the present invention. When the engine load increases beyond P1 of FIG. 9 and reaches P2, the IVC is varied from IVC1 on the early closing side (advanced side) to IVC2 on the late closing side (retarded side), like the first embodiment.

On the other hand, the valve opening timing (IVO) of intake valve 4 is varied from IVO1 to IVO2 on the advanced side by cooperation of intake VEL1 and the intake VTC.

Moreover, exhaust VTC3 is actuated, so that the exhaust valve opening timing (EVO) is varied from EVO1 to EVO2 on the retarded side, and so that the exhaust closing timing (EVC) is varied from EVC1 to EVC2 on the retarded side.

Accordingly, the valve overlap increases by the advance control of the IVO and the retard control of the EVC. That is, it varies in engine load P1 as shown in dashed lines of FIG. 10.

As mentioned above, IVC2 is closed after the piston bottom dead center (the late closing), so that the combustion is improved. Accordingly, it is possible to increase the valve overlap (the internal EGR). Therefore, it is possible to further decrease the pumping loss, and to further improve the exhaust emission performance.

The valve overlap decreases as the load increases, so as to decrease the internal EGR. By so doing, the intake charging efficiency of the flesh air is improved to increase the torque.

A variation line (broken line of FIG. 12) on a load reduction side (when the load decreases) is set, and is different from the variation line (the solid line of FIG. 12) from the load P1 on the load increase side (when the load increases). That is, the start of the variation on the load increase side is at P1, P2. The start of the variation on the load reduction side is at P1', P2'. Between these, there is provided a hysteresis h of the load. Accordingly, it is possible to prevent the valve timing from frequently switching, by the hysteresis h even when the load is slightly varied in the vicinity of P2, and to prevent hunting.

Third Embodiment

FIG. 13A shows a P1 characteristic (switching of early closing->late closing), in a variable valve actuating apparatus according to a third embodiment of the present invention. A horizontal axis of FIG. 13A represents the engine speed (rpm), and a longitudinal axis of FIG. 13A represents a brake mean effective pressure. FIG. 13B is a characteristic view showing the IVC of the intake valve in accordance with the variation of the load at the idle. FIG. 13C is a characteristic view showing the IVC of the intake valve in accordance with the variation of the load in the middle speed region. The brake mean effective pressure is an index of the load which is not affected by the engine displacement, unlike the torque.

P1a at the idle rotation Na is a mean effective pressure of substantially 3-7 Bar. P1a is a large load which is substantially half of maximum load P2a (10 Bar) at engine speed Na.

Moreover, at P1a (Na), a length A from IVC1 to the intake bottom dead center and a length A' from the intake bottom dead center to IVC2 are increased, as shown in FIG. 13B. Accordingly, it is possible to sufficiently improve the fuel consumption by the low friction of the valve operating system by the early closing of IVC in the light load region in the low speed region in which the fuel consumption is more important. Moreover, it is possible to improve the generation of the deterioration of the combustion caused by the low engine speed in the load equal to or greater than P1a by the late closing of the IVC, and to obtain the good fuel consumption irrespective of the load.

On the other hand, A, A' become small as the engine speed increases as shown in FIG. 13C. This is because it is necessary that IVC approaches the bottom dead center to ensure the intake charging efficiency to the cylinder as the engine speed increases. Moreover, the combustion is improved as the engine speed increases. Accordingly, it is unnecessary that A' increases at the middle engine speed Nb.

P1 decreases as the engine speed increases. The load becomes P1b which is substantially no load, at the middle engine speed Nb. That is, when the engine speed increases, the IVC is the late closing for the small load state. Accordingly, it is possible to improve the accelerator response.

This invention is not limited to the structures of the embodiments. The valve timing may be, for example, an acceleration start timing and an acceleration end timing from which a rump section of the valve lift curve is removed. With this, it is possible to further approach the operation timings of the actual intake and exhaust valves, and to improve the control accuracy. Moreover, the present invention is applicable to any mechanism arranged to continuously vary the intake valve closing timing (IVC).

The variable valve control apparatus according to the embodiments of the present invention includes a variable valve actuating mechanism arranged to vary a closing timing of an intake valve; and a controller configured to advance the closing timing of the intake valve before a bottom dead center of a piston of an intake stroke until a load of an engine increases from a minimum load to a predetermined load, and to retard the closing timing of the intake valve from a timing before the bottom dead center of the piston, to a timing after the bottom dead center of the piston when the load becomes the predetermined load.

Accordingly, it is possible to decrease the pumping loss, to decrease the friction of the valve operating system, and to improve the fuel consumption.

Moreover, the closing timing of the intake valve is retarded from (after) the piston bottom dead center in the partial load region which is slightly high load. Accordingly, it is possible to decrease the pumping loss, and to improve the combustion. That is, the air-fuel mixture generated in the cylinder (combustion chamber) is returned to the intake port to stir the air-fuel mixture in the intake port. This air-fuel mixture is again inhaled into the cylinder. Accordingly, it is possible to further uniformize the air-fuel mixture in the cylinder. Therefore, it is possible to improve the combustion and the fuel consumption, and to improve the exhaust emission performance.

In this way, in the embodiments of the present invention, it is possible to improve the combustion without the flow regulating valve, to improve the output of the engine, and to decrease the cost.

In the variable valve control apparatus according to the embodiments of the present invention, the controller is configured to move (advance) the closing timing of the intake valve closer to the bottom dead center of the piston when the load further increases beyond the predetermined load after the closing timing of the intake valve becomes the timing after the bottom dead center of the piston.

In the variable valve control apparatus according to the embodiments of the present invention, the variable valve actuating mechanism is arranged to vary an operation angle and a lift quantity of the intake valve.

In the variable valve control apparatus according to the embodiments of the present invention, the variable valve actuating mechanism is arranged to continuously vary the closing timing of the intake valve; and the controller is configured to continuously retard the closing timing of the intake valve closer to the bottom dead center of the piston from the timing before the bottom dead center of the piston until the load of the engine increases from the minimum load to the predetermined load.

In the variable valve control apparatus according to the embodiments of the present invention, the controller is configured to continuously advance the closing timing of the intake valve closer to the bottom dead center of the piston when the load further increases beyond the predetermined load after the closing timing of the intake valve becomes the timing after the bottom dead center of the piston.

In the variable valve control apparatus according to the embodiments of the present invention, a rate of change of the closing timing of the intake valve at the predetermined load is larger than a rate of change of the closing timing of the intake valve at a load other than the predetermined load.

In the variable valve control apparatus according to the embodiments of the present invention, the controller is configured to control so that a time period from the bottom dead center of the piston to the closing timing of the intake valve when the load becomes the predetermined load is longer than a time period from the closing timing of the intake valve to the bottom dead center of the piston immediately before the load becomes the predetermined load.

In the variable valve control apparatus according to the embodiments of the present invention, the controller is configured to control so that a time period from the closing timing of the intake valve to the bottom dead center of the piston immediately before the load becomes the predetermined load is substantially identical to a time period from the bottom dead center of the piston to the closing timing of the intake valve when the load becomes the predetermined load.

In the variable valve control apparatus according to the embodiments of the present invention, there is provided a hysteresis between the predetermined load and a load at which the closing timing of the intake valve starts to advance when the load decreases from the load beyond the predetermined load.

In the variable valve control apparatus according to the embodiments of the present invention, the variable valve actuating mechanism is arranged to vary a closing timing of an exhaust valve; and the controller is configured to retard the closing timing of the exhaust valve, from a timing near the top dead center of the piston of the exhaust stroke when the load becomes the predetermined load.

In the variable valve control apparatus according to the embodiments of the present invention, the controller is configured to decrease a transient torque of the engine when the load becomes the predetermined load and the closing timing of the intake valve is varied from the timing before the bottom dead center of the piston, to the timing after the bottom dead center of the piston.

In the variable valve control apparatus according to the embodiments of the present invention, the controller is configured to decrease the transient torque of the engine by decreasing a fuel supply quantity to a combustion chamber of the engine.

In the variable valve control apparatus according to the embodiments of the present invention, the controller is configured to decrease the transient torque of the engine by retarding an ignition timing.

In the variable valve control apparatus according to the embodiments of the present invention, the controller is configured to decrease the transient torque of the engine by increasing an internal EGR of the engine.

In the variable valve control apparatus according to the embodiments of the present invention, the controller is configured to decrease the transient torque of the engine by decreasing a throttle opening.

In the variable valve control apparatus according to the embodiments of the present invention, a controller is configured to advance the closing timing of the intake valve before a bottom dead center of a piston of an intake stroke when a variation of an accelerator opening is smaller than a predetermined quantity, and to retard the closing timing of the intake valve from a timing before the bottom dead center of the piston, to a timing after the bottom dead center of the piston when the variation of the accelerator opening becomes equal to or greater than the predetermined quantity.

In the variable valve control apparatus according to the embodiments of the present invention, a controller is configured to advance the closing timing of the intake valve before a bottom dead center of a piston of an intake stroke when a variation of an intake air is smaller than a predetermined quantity, and to retard the closing timing of the intake valve from a timing before the bottom dead center of the piston, to a timing after the bottom dead center of the piston when the variation of the intake air becomes equal to or greater than the predetermined quantity.

In the variable valve control apparatus according to the embodiments of the present invention, a controller configured to vary, in a first control state, the closing timing of the intake valve closer to a bottom dead center of a piston of an intake stroke until a load of an engine increases from a minimum load to a predetermined load, to suddenly vary, in a second control state, the closing timing of the intake valve from a timing before the bottom dead center of the piston, to a timing after the bottom dead center of the piston by a variation speed greater than a variation speed in the first control state when the load becomes exceeds the predetermined load, and to gently vary, in a third state, the closing timing of the intake valve closer to the bottom dead center of the piston by a variation speed smaller than the speed in the second control state when the load further increases beyond (over) the predetermined load.

In the variable valve control apparatus according to the embodiments of the present invention, the controller is configured to control a throttle opening in the first control state to a large opening degree in the first control state, and to control a throttle opening in the third control state to the large opening degree substantially identical to the large opening degree in the first control state.

In the variable valve control apparatus according to the embodiments of the present invention, the variable valve actuating mechanism includes a first variable valve actuating mechanism arranged to continuously vary an operation angle of the intake valve, and a second variable valve actuating mechanism arranged to continuously vary a lift phase of the intake valve.

The entire contents of Japanese Patent Application No. 2008-223070 filed Sep. 1, 2008 are incorporated herein by reference.

Although the invention has been described above by reference to certain embodiments of the invention, the is invention is not limited to the embodiments described above. Modifications and variations of the embodiments described above will occur to those skilled in the art in light of the above teachings. The scope of the invention is defined with reference to the following claims.

What is claimed is:

1. A variable valve control apparatus comprising:
   a variable valve actuating mechanism arranged to vary a closing timing of an intake valve; and
   a controller configured
      to advance the closing timing of the intake valve before a bottom dead center of a piston of an intake stroke until a load of an engine increases from a minimum load to a predetermined load, and
      to retard the closing timing of the intake valve from a timing before the bottom dead center of the piston, to a timing after the bottom dead center of the piston when the load becomes the predetermined load.

2. The variable valve control apparatus as claimed in claim 1, wherein the controller is configured to advance the closing timing of the intake valve closer to the bottom dead center of the piston when the load further increases beyond the predetermined load after the closing timing of the intake valve becomes the timing after the bottom dead center of the piston.

3. The control apparatus as claimed in claim 1, wherein the variable valve actuating mechanism is arranged to vary an operation angle and a lift quantity of the intake valve.

4. The variable valve control apparatus as claimed in claim 1, wherein the variable valve actuating mechanism is arranged to continuously vary the closing timing of the intake valve; and the controller is configured to continuously retard the closing timing of the intake valve closer to the bottom dead center of the piston from the timing before the bottom dead center of the piston until the load of the engine increases from the minimum load to the predetermined load.

5. The variable valve control apparatus as claimed in claim 4, wherein the controller is configured to continuously advance the closing timing of the intake valve closer to the bottom dead center of the piston when the load further increases beyond the predetermined load after the closing timing of the intake valve becomes the timing after the bottom dead center of the piston.

6. The variable valve control apparatus as claimed in claim 5, wherein a rate of change of the closing timing of the intake valve at the predetermined load is larger than a rate of change of the closing timing of the intake valve at a load other than the predetermined load.

7. The variable valve control apparatus as claimed in claim 6, wherein the controller is configured to control so that a time period from the bottom dead center of the piston to the closing timing of the intake valve when the load becomes the predetermined load is longer than a time period from the closing timing of the intake valve to the bottom dead center of the piston immediately before the load becomes the predetermined load.

8. The variable valve control apparatus as claimed in claim 6, wherein the controller is configured to control so that a time period from the closing timing of the intake valve to the bottom dead center of the piston immediately before the load becomes the predetermined load is substantially identical to a time period from the bottom dead center of the piston to the closing timing of the intake valve when the load becomes the predetermined load.

9. The variable valve control apparatus as claimed in claim 1, wherein there is provided a hysteresis between the predetermined load and a load at which the closing timing of the intake valve starts to advance when the load decreases from the load beyond the predetermined load.

10. The variable valve control apparatus as claimed in claim 1, wherein the variable valve actuating mechanism is arranged to vary a closing timing of an exhaust valve; and the controller is configured to retard the closing timing of the exhaust valve, from a timing near the top dead center of the piston of the exhaust stroke when the load becomes the predetermined load.

11. The variable valve control apparatus as claimed in claim 1, wherein the controller is configured to decrease a transient torque of the engine when the load becomes the predetermined load and the closing timing of the intake valve is varied from the timing before the bottom dead center of the piston, to the timing after the bottom dead center of the piston.

12. The variable valve control apparatus as claimed in claim 11, wherein the controller is configured to decrease the transient torque of the engine by decreasing a fuel supply quantity to a combustion chamber of the engine.

13. The variable valve control apparatus as claimed in claim 11, wherein the controller is configured to decrease the transient torque of the engine by retarding an ignition timing.

14. The variable valve control apparatus as claimed in claim 11, wherein the controller is configured to decrease the transient torque of the engine by increasing an internal EGR of the engine.

15. The variable valve control apparatus as claimed in claim 11, wherein the controller is configured to decrease the transient torque of the engine by decreasing a throttle opening.

16. A variable valve control apparatus comprising:
a variable valve actuating mechanism arranged to vary a closing timing of an intake valve; and
a controller configured
to advance the closing timing of the intake valve before a bottom dead center of a piston of an intake stroke when a variation of an accelerator opening is smaller than a predetermined quantity, and
to retard the closing timing of the intake valve from a timing before the bottom dead center of the piston, to a timing after the bottom dead center of the piston when the variation of the accelerator opening becomes equal to or greater than the predetermined quantity.

17. A variable valve control apparatus comprising:
a variable valve actuating mechanism arranged to vary a closing timing of an intake valve; and
a controller configured
to advance the closing timing of the intake valve before a bottom dead center of a piston of an intake stroke when a variation of an intake air is smaller than a predetermined quantity, and
to retard the closing timing of the intake valve from a timing before the bottom dead center of the piston, to a timing after the bottom dead center of the piston when the variation of the intake air becomes equal to or greater than the predetermined quantity.

18. A variable valve control apparatus comprising:
a variable valve actuating mechanism arranged to vary a closing timing of an intake valve; and
a controller configured
to vary, in a first control state, the closing timing of the intake valve closer to a bottom dead center of a piston of an intake stroke until a load of an engine increases from a minimum load to a predetermined load,
to suddenly vary, in a second control state, the closing timing of the intake valve from a timing before the bottom dead center of the piston, to a timing after the bottom dead center of the piston by a variation speed greater than a variation speed in the first control state when the load becomes exceeds the predetermined load, and
to gently vary, in a third state, the closing timing of the intake valve closer to the bottom dead center of the piston by a variation speed smaller than the speed in the second control state when the load further increases beyond the predetermined load.

19. The variable valve control apparatus as claimed in claim 18, wherein the controller is configured to control a throttle opening in the first control state to a large opening degree in the first control state, and to control a throttle opening in the third control state to the large opening degree substantially identical to the large opening degree in the first control state.

20. The variable valve control apparatus as claimed in claim 18, wherein the variable valve actuating mechanism includes a first variable valve actuating mechanism arranged to continuously vary an operation angle of the intake valve, and a second variable valve actuating mechanism arranged to continuously vary a lift phase of the intake valve.

* * * * *